US005963406A

United States Patent [19]
Neiger et al.

[11] Patent Number: 5,963,406
[45] Date of Patent: Oct. 5, 1999

[54] ARC FAULT DETECTOR WITH CIRCUIT INTERRUPTER

[75] Inventors: Benjamin B. Neiger, New York; Roger M. Bradley, North Bellmore; James N. Pearse, Dix Hills; William J. Rose, Woodbury, all of N.Y.; Albert Zaretsky, Boynton Beach, Fla.

[73] Assignee: Leviton Manufacturing Co., Inc., Little Neck, N.Y.

[21] Appl. No.: 08/994,772

[22] Filed: Dec. 19, 1997

[51] Int. Cl.⁶ .................................................... H02H 3/00
[52] U.S. Cl. .................................. 361/42; 361/45; 361/94
[58] Field of Search ............................... 361/42–50, 69, 361/93, 94, 102

[56] References Cited

U.S. PATENT DOCUMENTS

| | | |
|---|---|---|
| 4,376,243 | 3/1983 | Renn et al. . |
| 4,466,071 | 8/1984 | Russell, Jr. . |
| 4,618,907 | 10/1986 | Leopold ................................... 361/45 |
| 4,658,322 | 4/1987 | Rivera . |
| 4,709,293 | 11/1987 | Gershen et al. . |
| 4,878,144 | 10/1989 | Nebon . |
| 5,185,684 | 2/1993 | Beihoff et al. . |
| 5,185,686 | 2/1993 | Hansen et al. ............................. 361/45 |
| 5,202,662 | 4/1993 | Bienwald et al. . |
| 5,206,596 | 4/1993 | Beihoff et al. . |
| 5,223,795 | 6/1993 | Blades . |
| 5,224,006 | 6/1993 | Mackenzie et al. . |
| 5,280,404 | 1/1994 | Ragsdale . |
| 5,432,455 | 7/1995 | Blades . |
| 5,434,509 | 7/1995 | Blades . |
| 5,459,630 | 10/1995 | MacKenzie et al. . |
| 5,561,505 | 10/1996 | Lewis . |
| 5,590,012 | 12/1996 | Dollar, II . |
| 5,689,180 | 11/1997 | Carlson .................................... 323/359 |
| 5,715,125 | 2/1998 | Neiger et al. . |
| 5,805,397 | 9/1998 | MacKenzie . |
| 5,805,398 | 9/1998 | Rae . |
| 5,815,352 | 9/1998 | MacKenzie . |
| 5,818,237 | 10/1998 | Zuercher et al. . |
| 5,835,321 | 11/1998 | Elms et al. . |
| 5,847,913 | 12/1998 | Turner et al. . |

*Primary Examiner*—Michael Sherry
*Attorney, Agent, or Firm*—Paul J. Sutton

[57] ABSTRACT

An arc fault detector embodied as both a stand alone device and in combination with a circuit interrupting device such as a ground fault circuit interrupter (GFCI) functions to provide protection from potentially dangerous arc fault conditions. The device utilizes line side and load side pickup coils to permit distinguishing between arc faults occurring on the line side and the load side of the device. The arc fault circuit interrupter (AFCI) circuitry portion of the device shares components from the GFCI circuitry portion as an integral part of its functionality. The AFCI utilizes the electromechanical power carrying, portion of the GFCI, including the AC line disconnect circuitry, the power supply and the physical housing. In addition, the AFCI employs quantitative detection using variable gain control in combination with either a load disconnect or audible/visual alarm indication. The device also includes a timer circuit, which permits the user to temporarily inhibit or disable the arc detection, and selective frequency filtering permitting arc detection in the presence of power line carrier communications. In addition, the device includes communication means to permit the device to communicate the occurrence and location of an arc fault to a centralized monitoring station.

60 Claims, 13 Drawing Sheets

ARC FAULT DETECTOR WITH CIRCUIT INTERRUPTER

FIELD OF THE INVENTION

The present invention relates to an apparatus and method for arc fault detection and more particularly relates to an apparatus and method for both a stand alone arc fault detector and an arc fault detector combined with a circuit interrupter device.

BACKGROUND OF THE INVENTION

Circuit breakers, fuses and ground fault circuit interrupters (GFCIs) are commonly used devices for protecting people and property from dangerous electrical faults. Fatalities and loss of property, however, still occur, being caused by electrical faults that go undetected by these protective devices. One such type of electrical fault that typically goes undetected are arc faults. Arcs are potentially dangerous due to the high temperatures contained within them. Thus, they have a high potential of creating damage, mostly through the initiation of fires. An arc, however, will only trip a GFCI if it produces sufficient current leakage to ground. In addition, an arc will trip a breaker only if the current, flowing through the arc, exceeds the trip parameters of the thermal/magnetic mechanism of the breaker. Therefore, an additional type of protection device is needed to detect and interrupt arcs that do not fit these criteria. An arc detector whose output is used to trigger a circuit interrupting mechanism is referred to as an arc fault circuit interrupter (AFCI).

According to the Consumer Product Safety Commission (CPSC) in 1992, it was estimated that "there were 41,000 fires involving home electrical wiring systems . . . which resulted in 320 deaths, 1600 injuries and $511 million in property losses." The CPSC further stated that "an electrically caused fire may occur if electrical energy is unintentionally converted to thermal energy and if the heat so generated is transferred to a combustible material at such a rate and for such a time as to cause the material to reach its ignition temperature." The two main causes of unintentional conversion of electrical energy to heat are excessive current and arcing. Circuit breakers and fuses are currently available to mitigate the results of excessive current, but no commercial system exists to mitigate arcing.

A dangerous condition may develop whenever prolonged arcing exists regardless of whether it involves industrial, commercial or residential power lines. However, mobile homes and especially homes with antiquated wiring systems are particularly vulnerable to fires started due to electrical causes. CPSC studies have shown that the frequency of wiring system fires is disproportionately high in homes over 40 years old.

The causes of arcing are numerous, for example: aged or worn insulation and wiring; mechanical and electrical stress caused by overuse, over currents or lightning strikes; loose connections; and excessive mechanical damage to insulation and wires. Two types of arcing occur in residential and commercial buildings: contact arcing and line arcing. Contact (or series) arcing occurs between two contacts in series with a load. Therefore, the load controls the current flowing in the arc. Line (or parallel) arcing occurs between lines or from a line to ground. Thus, the arc is in parallel with any load present and the source impedance provides the only limit to the current flowing in the arc. It is important for any arc detection system to be able to detect both contact and line arcing and to act appropriately depending upon the severity of the arc.

An example of contact arcing is illustrated in FIG. 1. The conductors 114, 116 comprising the cable 110, are separated and surrounded by an insulator 112. A portion of the conductor 114 is broken, creating a series gap 118 in conductor 114. Under certain conditions, arcing will occur across this gap, producing a large amount of localized heat. The heat generated by the arcing might be sufficient to break down and carbonize the insulation close to the arc 119. If the arc is allowed to continue, enough heat will be generated to start a fire.

A schematic diagram illustrating an example of line arcing is shown in FIG. 2. Cable 120 comprises electrical conductors 124, 126 covered by outer insulation 122 and separated by inner insulation 128. Deterioration or damage to the inner insulation at 121 may cause line fault arcing 123 to occur between the two conductors 124, 126. The inner insulation could have been carbonized by an earlier lightning strike to the wiring system, or it could have been cut by mechanical action such as a metal chair leg cutting into an extension cord.

The potentially devastating results of arcing are widely known and a number of methods of detecting arcs have been developed in the prior art. A large percentage of the prior art refers to detecting the high frequency signals generated on the AC line by arcs. FIG. 3 shows the wide spectrum noise 162 produced on the AC line by an arc. It is superimposed over the AC line voltage 164. An analysis of the arc waveform, using a frequency spectrum analyzer, shows that the overtones and high frequency harmonics contained within the waveform extend well into the GHz range. A graph illustrating the frequency spectrum analysis of the waveform 162 shown in FIG. 3 is shown in FIG. 4.

One major problem associated with any type of arc detection is false tripping. False tripping occurs when an arc detector produces a warning output, or disconnects a section of wiring from the voltage source, when a dangerous arcing condition does not actually exist. The two major causes of false tripping are normal appliance arcing and the inrush currents created by inductive and capacitive appliances. These two situations generate high frequency signals on the power line that are very similar to those generated by dangerous arcing. Thus. to be viable commercial devices, arc detectors must be able to distinguish arcing signals from the signals created by normal appliance use.

A wide range of prior art exists in the field of arc detection. Some of the prior art refers to specialized instances of arcing. For example, U.S. Pat. No. 4,376,243, issued to Renn, et al., teaches a device that operates with DC current. U.S. Pat. No. 4,658,322, issued to Rivera, teaches a device that detects arcing within an enclosed unit of electrical equipment. U.S. Pat. No. 4,878,144, issued to Nebon, teaches a device that detects the light produced by an arc between the contacts of a circuit breaker.

In addition, there are several patents that refer to detecting arcs on AC power lines that disclose various methods of detecting high frequency arcing signals. For example, U.S. Pat. Nos. 5,185,684 and 5,206,596, both issued to Beihoff et al., employ a complex detection means that separately detects the electric field and the magnetic field produced around a wire. U.S. Pat. No. 5,590,012, issued to Dollar, teaches measuring the high frequency current in a shunted path around an inductor placed in the line, which can be the magnetic trip mechanism of a breaker. In a second detection circuit, proposed by Dollar, high frequency voltage signal is extracted from the line via a high pass filter placed in parallel with any load.

Various methods can be found in the prior art to authenticate arcing and to differentiate arcing from other sources of noise. Much of the prior art involves complicated signal processing and analysis. U.S. Pat. No. 5,280,404, issued to Ragsdale, teaches looking for series arcing by converting the arcing signals to pulses and counting the pulses.

In addition, several patents detect arcing by taking the first derivative or second derivative of the detected signal. For example, U.S. Pat. No. 5,224,006, issued to MacKenzie et al., and U.S. Pat. Nos. 5,185,694 and 5,206,596, issued to Beihoff et al, disclose such a device.

Blades uses several methods to detect arcs as disclosed in U.S. Pat. Nos. 5,223,795, 5,432,455 and 5,434,509. The Blades device is based on that fact that detected high frequency noise must include gaps at each zero crossing, i.e., half cycle, of the AC line. To differentiate arcing from other sources of noise, the Blades device measures the randomness and/or wide bandwidth characteristics of the detected high frequency signal. The device taught by U.S. Pat. No. 5,434,509 uses the fast rising edges of arc signals as a detection criterion and detects the short high frequency bursts associated with intermittent arcs.

U.S. Pat. No. 5,561,505, issued to Zuercher et al., discloses a method of detecting arcing by sensing cycle to cycle changes in the AC line current. Differences in samples taken at the same point in the AC cycle are then processed to determine whether arcing is occurring.

SUMMARY OF THE INVENTION

The arc fault detection device of the present invention can operate either stand alone or in combination with a circuit interrupting device such as a ground fault circuit interrupter (GFCI). The combination device, known as an arc fault circuit interrupter/ground fault circuit interrupter (AFCI/GFCI), is realized by the addition of extra circuitry to a standard GFCI. An AFCI/GFCI device is a combination arc fault and ground fault detector, having the ability to interrupt the circuit and thereby prevent dangerous arcing and ground fault conditions from harming personnel or property. The term 'circuit interrupting device' is defined to mean any electrical device used to interrupt current flow to a load and includes, but is not limited to devices such as Ground Fault Circuit Interrupters (GFCIs), Immersion Detection Circuit Interrupters (IDCIs) or Appliance Leakage Circuit Interrupters (ALCIs).

In the AFCI/GFCI circuit of the present invention, an arcing signal is detected on the AC line via two identical pickup coils: a line side coil and a load side coil. The signal from each pickup coil is fed into its own processing circuitry comprising an automatic gain control (AGC) amplifier, a frequency selective network, a perfect rectifier and a time delay peak detector. The output of the peak detector in the line side circuit is fed back to the AGC amplifiers in the load side circuit and vice versa. This unique approach enhances the reliability of arc detection.

The detection of an arc by the device of the present invention is limited to detecting an absolute value of the amplitude of the arc as a result of the electromagnetic generated voltage or current on the power line. The detection comprises ideal rectification of the chaotic waveform. The signal is extracted in a novel manner by utilizing a variable gain controlled (transconductance) amplifier with a compression ratio of at least 40 dB at the input of the signal processing path. A suitable amplifier is one manufactured by Plessey, England. This scheme permits even very large arcs to be detected without overloading the processing circuitry.

A unique aspect of the present invention is that it is capable of distinguishing between arc faults on the line and load sides of the device. Depending on the location of the arc fault, i.e., line side or load side, AC power is either disconnected to the load or an audible or visual annunciator is activated. Once processed, the peak amplitudes of the two sense signals, i.e., line side and load side sense signals, are compared via two comparators. If the signal venerated by the line side circuit is greater than the signal generated by the load side circuit, the output causes an audible or visual indication to be generated. On the other hand, if the arc signal generated by the line side circuit is less than the signal generated by the load side circuit, the interrupting mechanism of the GFCI is activated and the load is disconnected from the AC line. Thus, arcs detected occuring on the load side of the device cause the device to disconnect the AC line from the load.

The use of two different sensing circuits generating separate line and load side signals provides the following three advantages.

1. If an arc occurs on the load side of the AFCI/GFCI, the device will trip and the arc will be extinguished. However, equipment located up stream from the device can still function since AC power to them is not interrupted.
2. Locating the position of a fault is simplified when several AFCI/GFCI devices are used on the same branch circuit, even without any communication of the occurrence of the fault to a central location.
3. Indicating the presence of arcing on the line side of the AFCI/GFCI permits the detection of a problem between the circuit breaker or transformer and the device, while preventing false tripping from disturbances in the utility distribution system.

The arc detector of the present invention can be implemented as a standalone device or can be implemented in combination with an existing electrical device such as a GFCI. A feature of the arc detector of the present invention is that it combines an arc detector, i.e., arc fault circuit interrupter (AFCI), with a circuit interrupting device, such as a ground fault circuit interrupter (GFCI), to create an AFCI/GFCI multipurpose device. Such a device has the ability to interrupt the AC power and thereby prevent a dangerous arcing or ground fault condition from harming personnel or property. Note that existing GFCIs can detect an arc fault if the arc generated ground fault current from either phase or neutral to ground. However, the AFCI dedicated circuitry is functions to detect both series arcs and parallel arcs that do not happen to generate leakage current to ground. The novel use of common circuit elements provides high noise immunity for the arc detector and thus helps to prevent false tripping of the device.

The arc detection circuitry can be placed onboard the same silicon chip typically used in today's GFCI. Indeed, some of the pins of the currently utilized GFCI integrated circuit can be converted for multifunction operation. The AFCI can be powered from the same power supply that provides power to the GFCI. This combined approach results in reduced manufacturing costs. The mechanical parts of the GFCI device such as the trip relay and the mechanical contact closure mechanisms now serve dual purposes. In addition, adding AFCI circuitry to an existing GFCI is a logical enhancement of present day GFCIs since a GFCI can detect arcing in certain situations including any condition whereby an arc produces leakage current to ground.

The arc detector also incorporates an automatic bypass timer controls the AC line disconnect function in order to permit normally safe arcing. Rather than include an on/off fixed switch which would function to completely enable or disable the arc detector, the present invention incorporates a logical switch. This logic driven switch provides a user with the option of disabling the arc detector for as long as the switch is off or disabling the arc detector temporarily while arcing appliances are in use. This permits the use of appliances that normally generate high amounts of arcing that would otherwise cause the arc detector to trip. When the arc detector is temporarily disabled, it automatically return to the enabled state after the appliance has been disconnected. This scheme has the advantage that the device cannot accidentally be permanently disabled by the user. An important feature of this scheme is that the arcing appliance can be turned on and off within the given time period without tripping the arc detector. Note that the ground fault detection capability of the device is never disabled, so the user is always protected from ground faults.

Today, AC power lines are not only used for supplying AC line current but they are also used as a media for communications as in Leviton Manufacturing's CCS line of power line carrier devices, CEBus compatible devices, power line carrier based intercoms, TV signal transmission/reception equipment, telephone communication devices, etc. The arc detector of the present invention incorporates a filter circuit having a sharp cut off slope of approximately 500 KHz which permits the detection of arc faults while communications over the AC power lines is occurring. The filter circuit functions to remove frequencies below 500 KHz thus preventing false tripping due to the various communication signals potentially present on the AC line while permitting the arc fault device to communicate with other devices using power line carrier communications. On the other end of the frequency spectrum, although arcing generates frequencies into the GHz range, for simplicity, efficiency and cost effectiveness, the arc detector of the present invention limits detection of high frequency signals to approximately 20 MHz.

Further, the arc detector includes circuitry to transmit messages using any suitable communication means pinpointing the location of arc fault. For example, such communication means may comprise any power line carrier, RF, twisted pair or IR communications technology. An example of power line carrier communications include Lon Works and CEFBus communications systems. By way of example only, the present invention incorporates a communications circuit, which in utilizes a power line carrier signal such as generated by the CCS product line manufactured by Leviton Manufacturing, Little Neck, New York. Using well known power line carrier techniques the arc detector can communicate with another device such as a monitoring station. Each arc detector would have a unique address. A relationship is then established between the address assigned to the arc detector and its location. When an arc fault is detected a signal is sent to a monitoring station which alerts personnel of not only the occurrence of the arc fault but also its location. This is helpful especially if the AFCI/GFCI device is installed in a remote location. This feature has applicability in industrial and commercial locations where central arc fault supervision over a complex AC electrical wiring system is needed.

BRIEF DESCRIPTION OF THE DRAWINGS

The invention is herein described, by way of example only, with reference to the accompanying drawings, wherein.

DETAILED DESCRIPTION OF THE INVENTION

Ground Fault Circuit Interrupters (GFCIs) are well known electrical devices in common use today. They are used to help protect against electrical shock due to ground faults. A GFCI is basically a differential current detector operative to trip a contact mechanism when 5 mA or more of unbalanced current is detected between the phase (hot or Ø) wire and the neutral (N) wire of an AC electrical power line. The unbalanced current detected is assumed to be flowing through a human accidentally touching the phase wire. The current flows through the human to ground rather than returning through the differential transformer via the neutral wire, thus creating the current imbalance described above. It should be noted that, not only current through a human, but also an appliance with inherent leakage to ground of 5 mA or more, would also trip the GFCI and disconnect the current to the load.

Figure 1:
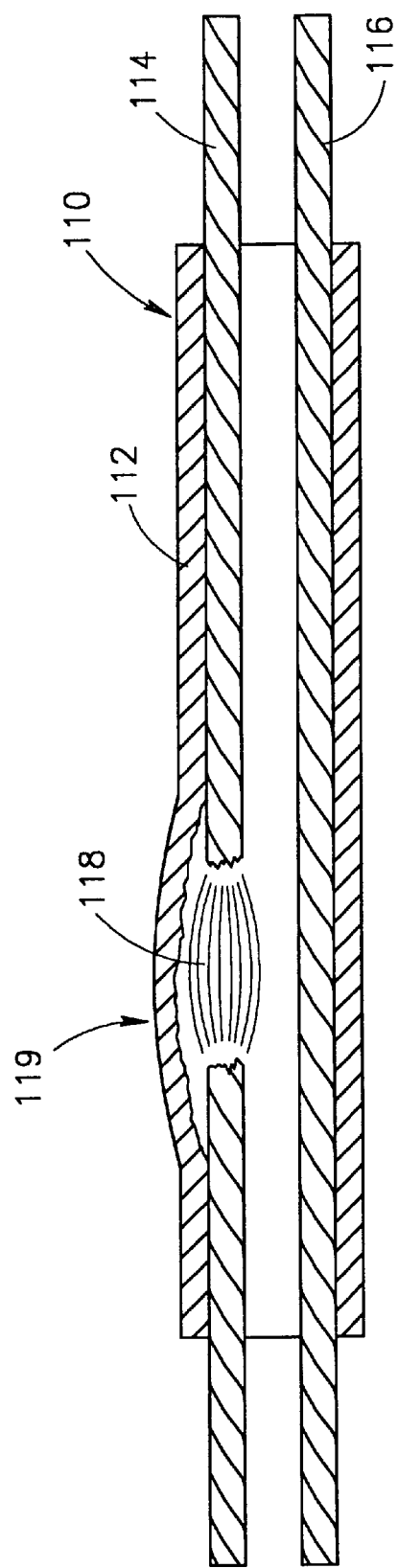
FIG. 1 is a schematic diagram illustrating an example of contact arcing in a current carrying conductor.
Figure 2:
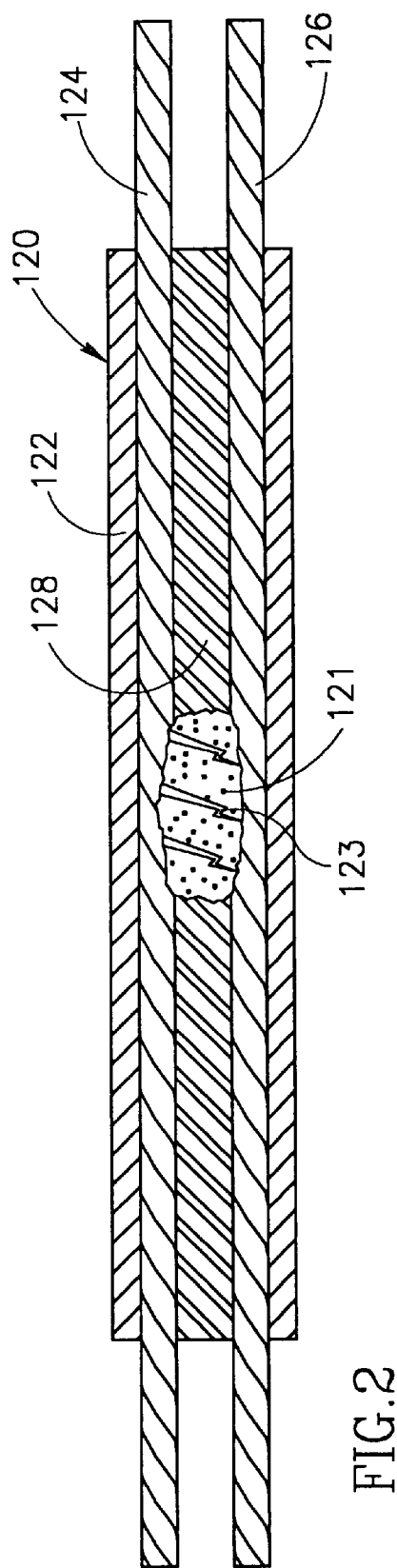
FIG. 2 is a schematic diagram illustrating an example of line arcing between two current carrying conductors.
Figure 3:
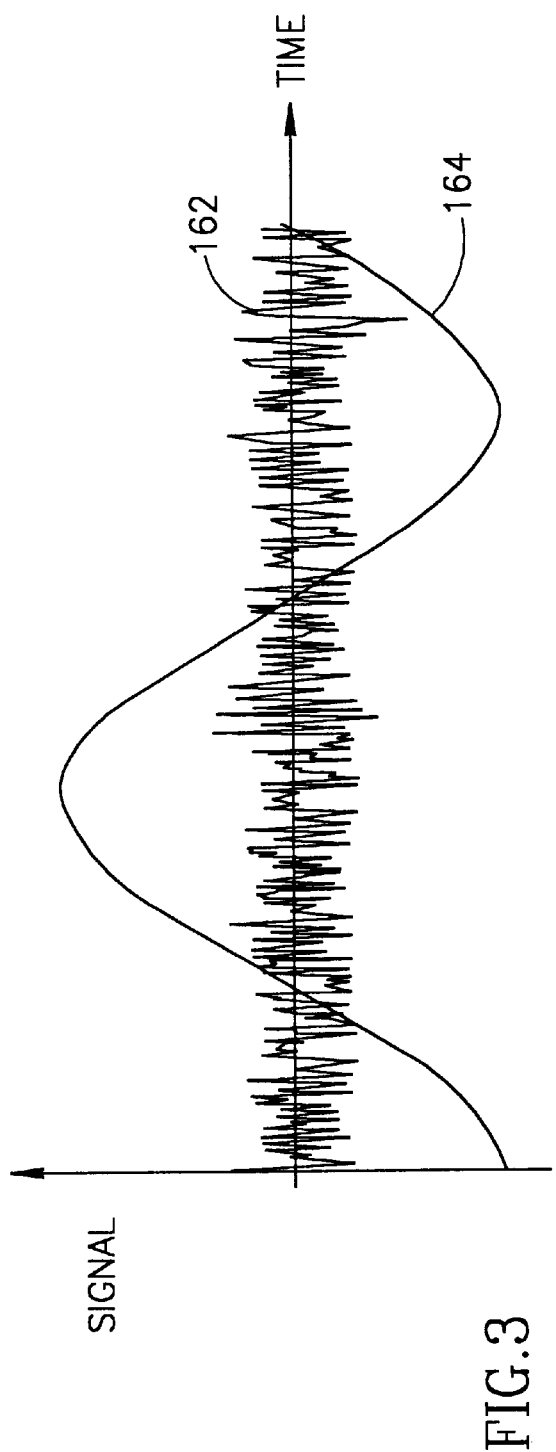
FIG. 3 is a graph illustrating the broad spectrum noise, due to the FMF voltage generated by an arc, propagating over the power line, the noise superimposed over the AC line voltage.
Figure 4:
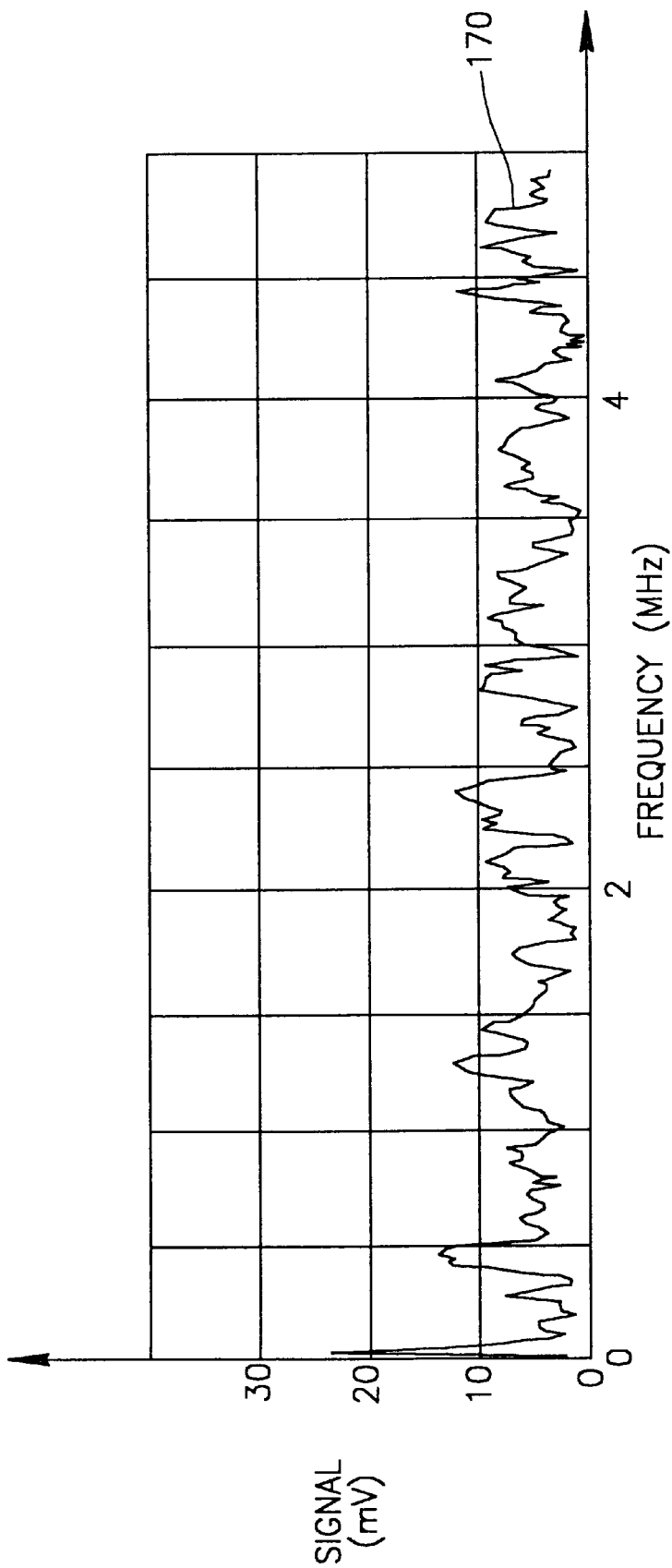
FIG. 4 is a graph illustrating frequency spectrum analysis of the waveform shown in FIG. 3.
Figure 5:
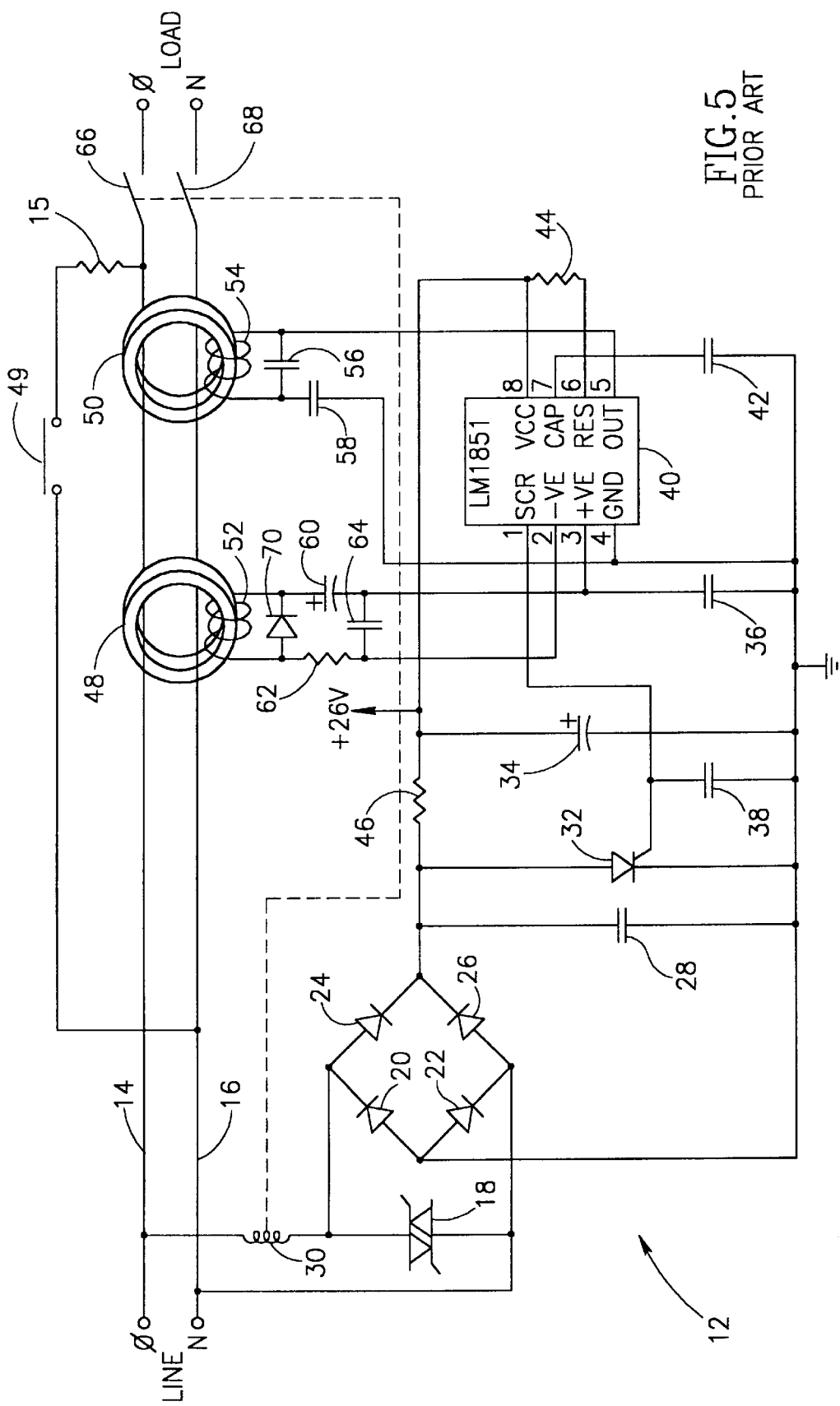
FIG. 5 is a schematic diagram illustrating an example prior art ground fault circuit interrupter device.

A schematic diagram illustrating an example of a prior art ground fault circuit interrupter device is shown in FIG. 5. The typical prior art GFCI, generally referenced 12, comprises two current transformers consisting of magnetic cores 48, 50 and coils 52, 54, respectively, coupled to integrated circuit 40 which may comprise the LM1851 manufactured by National Semiconductor. A relay coil 30 is placed between the phase and one input to a full wave bridge rectifier. The AC power from the phase 14 and neutral 16 conductors is full wave rectified via a full wave rectifier comprising diodes 20, 22, 24, 26. A metal oxide varistor (MOV) 18 is placed across phase and neutral for protection.

The output of the bridge is coupled across capacitor 28 and silicon controlled rectifier (SCR) 32. The gate of the SCR is coupled to ground via capacitor 38 and to pin 1 of IC 40.

A diode 70 is placed across the coil 52 which is coupled to pins 2 and 3 via resistor 62 and capacitors 64, 60. Pin 3 is also coupled to ground via capacitor 36. Coil 54 is coupled to pins 4 and 5 of IC 40 via capacitors 58, 56. Pin 4 is also coupled to ground. Pin 6 of IC 40 is coupled to pin 8 via resistor 44 and pin 7 is coupled to ground via capacitor 42. Pin 8 is also coupled to capacitor 34 and to resistor 46. The voltage on pin 8 serves as the 26 V supply voltage for the GFCI circuitry.

Line side electrical conductors, phase 14 and neutral 16, pass through the transformers to the load side phase and neutral conductors. A relay, consisting of switches 66, 68, associated with the phase and neutral conductors, respectively, function to open the circuit in the event a ground fault is detected. The switches 66, 68 are part of a double throw relay which includes coil 30. The coil 30 in the relay is energized when the GFCI circuitry turns on the silicon controlled rectifier (SCR) 32. In addition, the GFCI 12 comprises a test circuit comprised of momentary push button switch 49 connected in series with a resistor 15. When the switch 49 is pressed, a temporary simulated ground fault, i.e., a temporary differential current path, from phase to neutral is created in order to test the operation of the GFCI 12.

Figure 6:
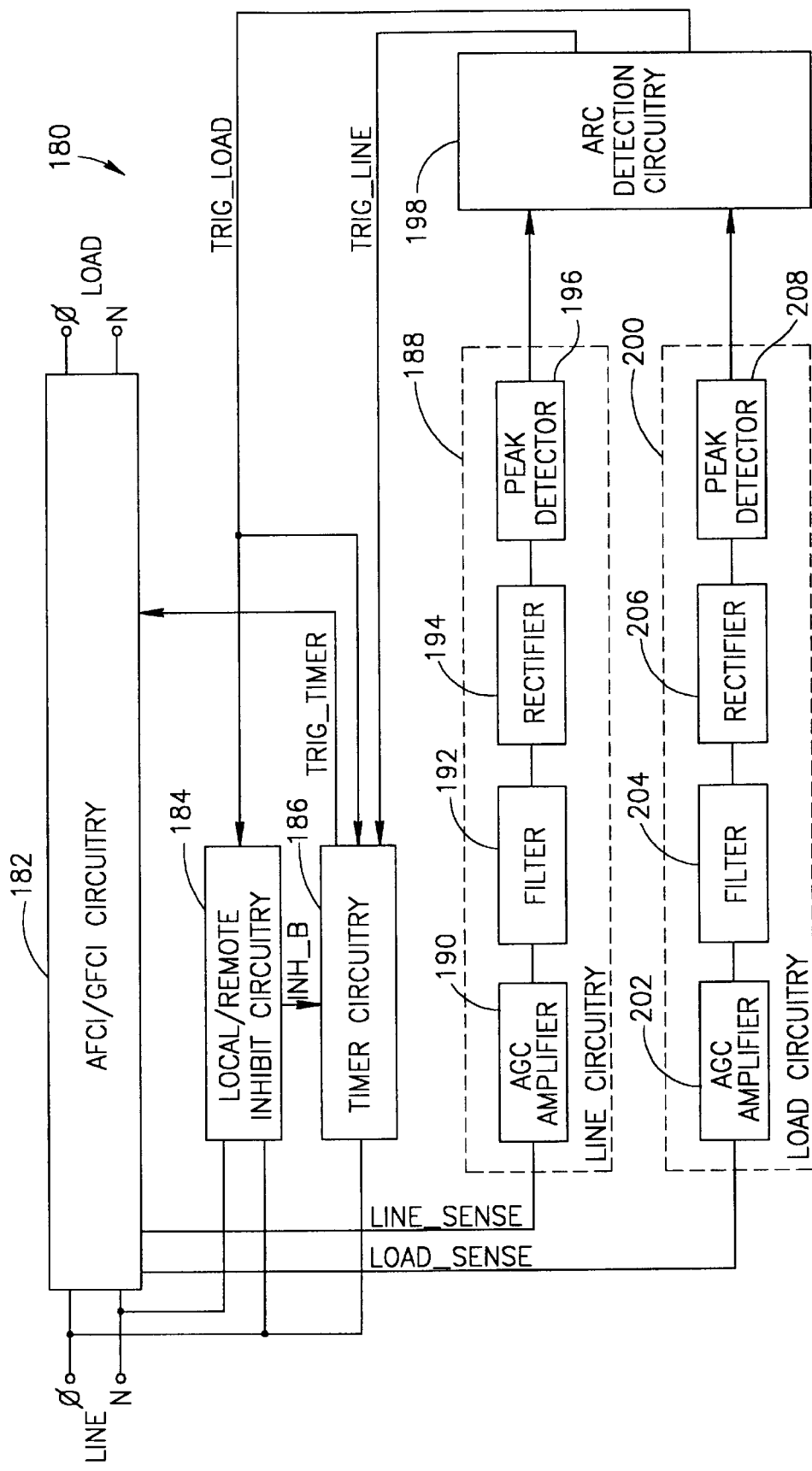
FIG. 6 is a high level block diagram illustrating the arc fault detector with ground fault circuit interrupter device of the present invention.

A high level block diagram illustrating the arc fault/ground fault circuit interrupter (AFCI/GFCI) device of the present invention is shown in FIG. 6. For illustrative purposes only, the description that follows is within the context of a combination arc fault circuit interrupter/ground fault circuit interrupter (AFCI/GFCI) device. One skilled in the art could adapt other types of circuit interrupting devices such as IDCIs or AFCIs to be combined with the arc fault detector of the present invention.

The AFCI/GFCI device, generally referenced 180 and hereinafter referred to as the device, comprises AFCI/GFCI circuitry 182, line circuitry 188, load circuitry 200, arc detection circuitry 198, local/remote inhibit circuitry 184 and timer circuitry 186.

The AFCI/GFCI circuitry 182 generally comprises a standard GFCI device in addition to several components that are shared between the AFCI and the GFCI portions of the device. The device is a four terminal device comprising line side phase and neutral leads as well as load side phase and neutral leads. Normally, the device is coupled to an electrical wiring system or network with the line side phase and neutral terminal electrically connected to a source of AC power. The load side phase and neutral terminals are connected to electrical devices located downstream from the device.

Figure 7:
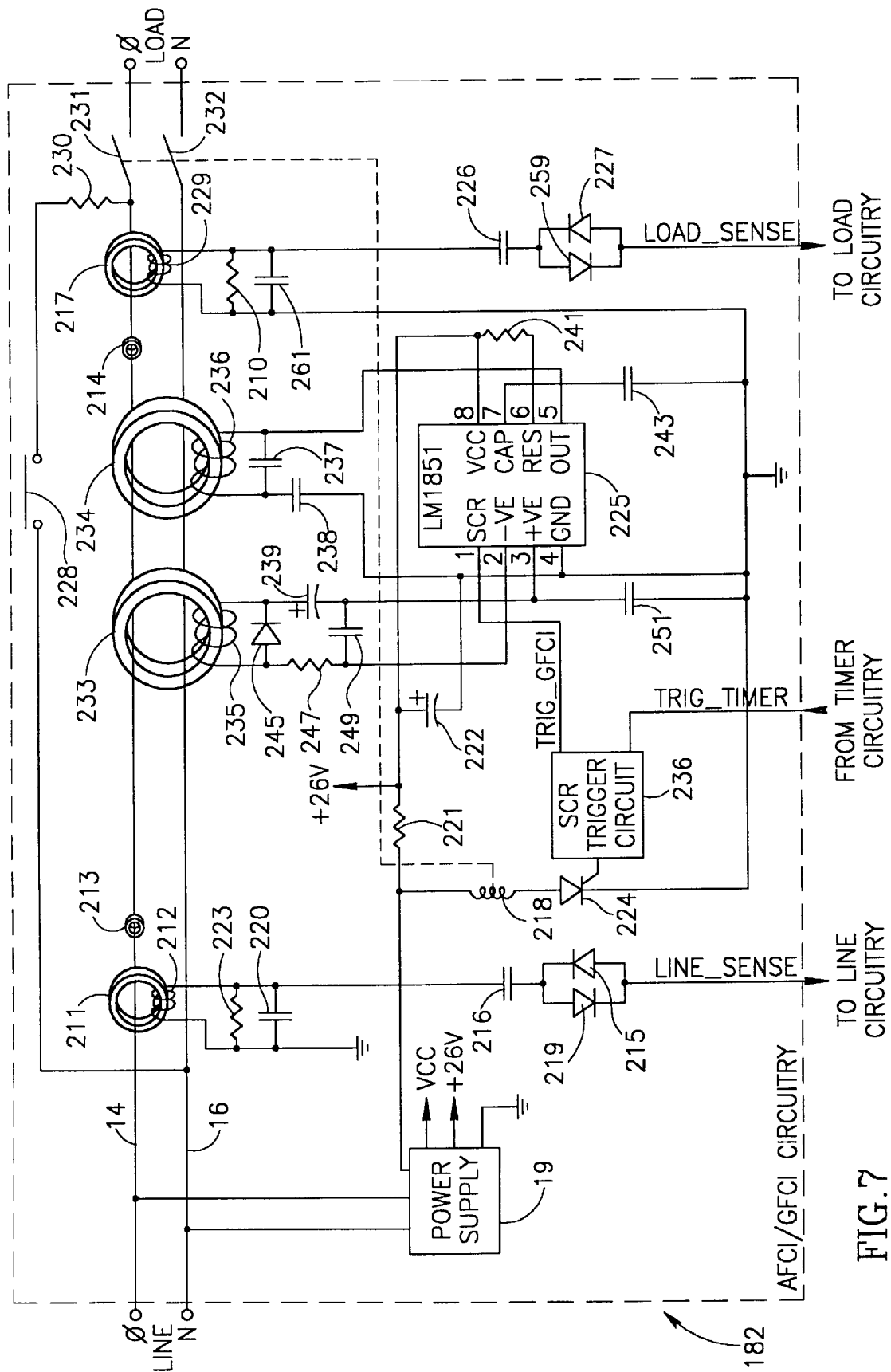
FIG. 7 is a schematic diagram illustrating the GFCI/AFCI circuitry portion of the arc fault detection device of the present invention in more detail.

Each of the components of the device 180 are described in more detail hereinbelow, beginning with the AFCI/GFCI circuitry, generally referenced 182. A schematic diagram illustrating the GFCI/AFCI circuitry portion of the arc fault detection device in more detail is shown in FIG. 7.

The ground fault detection circuitry portion of the device will now be described in more detail. In particular, the AFCI/GFCI circuit 182 comprises two current transformers consisting of magnetic cores 233, 234 and coils 235, 236, respectively, coupled to integrated circuit 225 which may comprise the LM1851 manufactured by National Semiconductor or the RA9031 manufactured by Raytheon. The AC power from the phase 14 and neutral 16 conductors is input to a power supply circuit 19 which functions to generate power for the relay coil, 26 V and a VCC voltage used to supply the internal circuitry of the AFCI/GFCI device.

The relay coil 218 is coupled in series with SCR 224. The gate of the SCR is coupled to the output of an SCR trigger circuit 236. The output of pin 1 of IC 225 forms one of the inputs to the SCR trigger circuit 236.

A diode 245 is placed across the coil 235 which is coupled to pins 2 and 3 via resistor 247 and capacitors 239, 249. Pin 3 is also coupled to ground via capacitor 251. Coil 236 is coupled to pins 4 and 5 of IC 225 via capacitors 237, 238. Pin 4 is also coupled to ground. Pin 6 of IC 225 is coupled to pin 8 via the sensitivity resistor 241 and pin 7 is coupled to ground via the time delay capacitor 243. Pin 8 is also coupled to capacitor 222 and to resistor 221. The voltage on pin 8 is connected to the 26 V supply voltage.

Line side electrical conductors, phase 14 and neutral 16, pass through the transformers to the load side phase and neutral conductors. A relay, consisting of switches 231, 232, associated with the phase and neutral conductors, respectively, function to open the circuit in the event a ground fault is detected. The switches or contacts 231, 232 are part of a double throw relay which includes coil 218. The coil 218 in the relay is energized when the AFCI/GFCI circuitry turns on the SCR 224. In addition, the circuit comprises a test circuit comprised of momentary push button switch 228 connected in series with a resistor 230. When the switch 228 is pressed, a temporary simulated ground fault from load phase to line neutral is created in order to test the operation of the device.

In operation, the GFCI device functions to detect an unbalanced current through the differential transformer 233. If the current imbalance is above a specified threshold the integrated circuit (IC) 225 triggers SCR 224. The SCR 224, in turn, activates the coil 218 thus disconnecting the source of electrical power from the load. When the GFCI circuitry detects the existence of a ground fault, the signal line TRIG_GFCI is made active. In this way the circuit protects users from harmful or lethal electric shocks. The SCR trigger circuit 236 has two trigger inputs, TRIG_GFCI and TRIG_TIMER. Normally the two trigger signals are in an inactive state. However, either of the two trigger inputs going active will cause the SCR trigger circuit to turn the SCR 224 on.

The second differential transformer 234 within the AFCI/GFCI circuitry is provided to detect a low impedance condition between the load side neutral wire and ground. A low impedance neutral/ground connection allows ground fault current to leak back from the ground to the neutral wire passing through the differential transformers. This reduces the sensitivity of the GFCI and potentially permits lethal ground faults to occur without the GFCI tripping. If the impedance of the neutral/ground connection becomes too low, the IC 225 triggers the SCR 224 via the TRIG_GFCI signal, thus disconnecting both phase and neutral from the load.

It is highly desirable for an arc fault detector to be able to pinpoint the precise location of an arcing fault within a branch circuit. To accomplish this, a key feature of the present invention exploits the properties of the GFCI transformers by combining the GFCI transformers with additional transformers and ferrite beads in order to provide the AFCI circuit with two separate signals: a line side signal and a load side signal.

The AC line is partitioned into two different segments separated by the GFCI portion of the circuitry. The AC line is split only for high frequency signals while the normal 50 or 60 Hz power transmission is unaffected. The load side portion comprises either an entire branch or a portion of a branch of the line which supplies power to the various loads located downstream of and protected by the device. In contrast, the line side portion comprises all the parts of the branch leading from the source, i.e., circuit breakers, transformers, street transformers, etc., to the device. Both the line and load arc sensing portions are separated by the GFCI transformers 233, 234 and two ferrite transformers or beads 213, 214 which function to enhance the impedance of the AC line to high frequency signals.

Both the line and load segments have associated detection circuitry, also known as the line side pickup and the load side pickup, respectively. The line side pickup comprises transformer 211 and coil 212 while the load side pickup comprises transformer 217 and coil 229. The arcing signal can also be detected using capacitive coupling via capacitors on both the line side pickup and the load side pickup (not shown). The technique of using capacitive coupling onto the AC line is a technique well known in the art. If arcing occurs on the load side of the AFCI/GFCI, the signal generated at the load side pickup will be greater than the signal generated at the line side pickup due to the attenuation of high frequencies caused by the separating impedance. On the other hand, arcing occurring on the line side will generate a larger signal at the line side pickup than at the load side pickup.

The two pickup transformers 211, 217 are constructed using a well known toroidal ferrite design techniques. The ferrite material and the turns ratio are preferably chosen to achieve a natural resonance at 1.5 MHz. The ferrite beads 213,214 are preferably matched to the ferrite transformers so as to achieve maximum added line impedance between the line and load pickups 211, 217 at these high frequencies.

The resistors 223, 210 in combination with capacitors 220, 261, respectively, form resonance damping networks for broadband frequency pickup. This enables the device to react to a wider range of arcing sources rather than limiting the device to detecting arc sources with limited frequency spectra. However, some residue resonance is beneficial in identifying arcs emanating from specific arcing loads and may be useful in discriminating actual arcing from non important noise sources.

Figure 8:
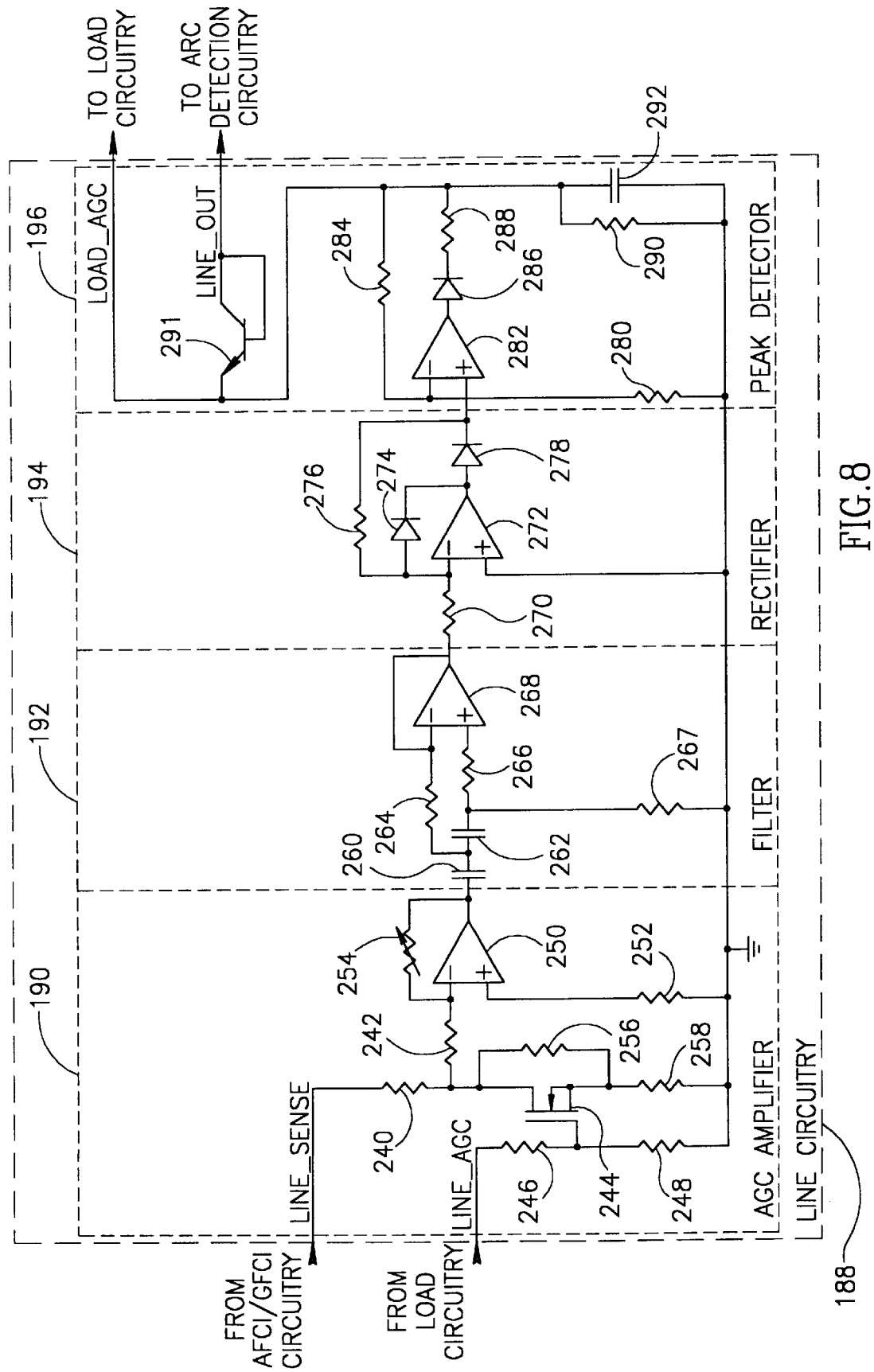
FIG. 8 is a schematic diagram illustrating the line circuitry portion of the present invention in more detail.

On the line side pickup portion, the signal generated by transformer 211 has separate processing circuitry associated therewith. In addition, capacitor 216 performs a DC decoupling function while diodes 219, 215 prevent low level signals below 0.6 V peak to peak from entering the processing circuit. The signal output by the line side pickup portion is labeled LINE_SENSE in FIG. 7. The diodes also help eliminate noise which is always present on the AC line, as shown in FIG. 8.

Similarly, on the load side pickup portion, the signal generated by transformer 217 has separate processing circuitry associated therewith. In addition, capacitor 226 performs a DC decoupling function while diodes 259, 227 prevent low level signals below 0.6 V peak to peak from entering the processing circuit. The signal output by the load side pickup portion is labeled LOAD_SENSE in FIG. 7.

Standard GFCI circuits are in widespread use today and numerous patents have been issued describing various methods of GFCI operation. Detailed descriptions of typical GFCI circuits can be found, for example, in U.S. Pat. No. 5,202,662, issued to Bienwald et al.

It is believed one novel feature of the present invention is the incorporation of circuitry necessary for detecting arc faults into a GFCI device. The remainder of this document describes the arc detection (AFCI) circuitry in more detail.

Note that both AFCI and GFCI circuits operate to interrupt the AC power by opening two sets of contacts 231, 232 via the actuation of a relay coil 218. The relay coil is actuated by triggering the SCR 224 via the SCR trigger circuit 236. Although either the AFCI or GFCI circuits can trigger the SCR 224, their triggering signals are isolated from one another. The SCR trigger circuit functions to provide an OR type logic operation to trigger the SCR 224 using well known thyristor triggering techniques when either of its two input trigger signals TRIG_GFCI and TRIG_TIMER go active.

With reference to FIG. 6, as described previously, the outputs of the line side and the load side pickup circuits (FIG. 7) are input to two separate processing circuits. The LINE_SENSE signal is input to the line circuit 188 which comprises an automatic gain control (AGC) amplifier 190, filter 192, full wave rectifier 194 and peak detector 196. The LOAD_SENSE signal is input to the load circuit 200 which comprises AGC amplifier 202, filter 204, full wave rectifier 206 and peak detector 208. The splitting of the pickup signals into line side and load side signals permits the device to differentiate between arcing occurring on the line side and arcing occurring on the load side of the device.

A schematic diagram illustrating the line circuitry portion of the present invention in more detail is shown in FIG. 8. The first four stages, i.e., AGC amplifier, filter, rectifier and peak detector with built in time delay, of processing for the LINE_SENSE signal are duplicated in the signal processing path for the LOAD_SENSE signal with only minor differences.

In the line processing path, the LINE_SENSE signal, which is a signal having an amplitude exceeding 0.6 V peak to peak, is fed into an AGC amplifier 190. The AGC amplifier comprises a resistive divider 240, 256, 258 which determines the maximum dynamic range of the amplifier. Feedback control is provided through FET transistor 244 which acts as a variable resistance in parallel with resistor 256. An additional resistor divider network 246, 248 provides a voltage level for the gate of FET 244. A unique aspect of this circuit is that the feedback signal input to FET 244 in the line circuit is proportional to the signal level developed on the load side, since the feedback signal LINE_AGC is input to the top of the resistor divider 246, 248. Similarly, the feedback signal LOAD_AGC fed back to the AGC amplifier in the load processing path (described hereinbelow in connection with FIG. 9) is proportional to the signal level developed on the line side. This arrangement provides extra differentiation between the line side and load side processed signals. The generation of the two feedback loops will be described in more detail below.

The AGC amplifier stage 190 comprises an operational amplifier (op amp) circuit 250 having a fixed gain provided by precision resistors 242, 254. Resistor 254 comprises a variable resistor in order to be able to match the base gain of the AGC amplifier stage in both the line and the load circuitry. The plus input of the op amp 250 is tied to ground potential by resistor 252. The minus input to the amplifier 250 is connected to the junction of resistor 240 and the feedback controlled FET 244 via resistor 242. To illustrate the effect of the feedback, assume that resistors 240, 256, 258 are all equal. With no feedback, FET 244 is open circuit and 67% of the LINE_SENSE signal enters the AGC amplifier. With full feedback, the FET transistor 244 is saturated and only 50% of the LINE_SENSE signal enters the amplifier. Thus, by altering the values of resistors 240, 256, 258 and resistors 246, 248, the weight and responsiveness of the feedback can be varied.

The output of the AGC amplifier is input to a frequency selective network 192. To aid in illustrating the principle of operation of the present invention, the filter shown in FIG. 8 is a well known $2^{nd}$ order Butterworth high pass active filter. In practice, however, this filter can be constructed using a 4 to 8 pole network in order to obtain sharp cut off response at frequencies below 500 KHz. This is needed in order to permit data communication on the AC power line without interfering with the detection of arcs. Note that frequency content of power line communications may extend as high as 400 KHz, e.g., CEBus spread spectrum signaling in the United States. The gain of the filter is set at unity to permit maximum utilization of the high frequency characteristics of the op amp. An advantage of using active filters constructed from op amps is their small size and low output impedance characteristics. Alternatively, however, LC filters can also be used where space is not a critical factor.

The high pass filter 192 is constructed around a single op amp circuit 268. Capacitors 260, 262 and resistors 264, 266, 267 perform the high pass filtering function. Utilizing these capacitors and resistors in conjunction with an op amp 268 provides a much steeper roll off in frequency gain below 500 KHz than would be achieved with passive components alone. The internal characteristics of the op amp itself provide the upper limit to the high frequencies passed by the filter. The characteristics of the filters in the line and the load circuits are preferably closely matched.

The output of the filter section 192 is input to what is known as a 'perfect rectifier' circuit 194. The rectifier 194 is able to perform rectification at input voltages in the millivolt range. Rectification is required to provide DC voltages for the feedback to the AGC amplifiers and for the comparators in the arc detection circuitry. The ability to rectify low level signals can be taken advantage of since much of the noise is eliminated at the input to the AGC amplifiers via diodes 219, 215, 259, 227 (FIG. 7).

The rectifier 194 is constructed around a single op amp 272. The plus input of the op amp 272 is tied to ground. The circuit provides a variable level of gain, depending on whether the input signal is positive or negative. For positive input signals the gain is zero.

For negative signals the gain is determined by the ratio of resistors 276 to 270. If the signal input to the minus input is negative relative to ground, the output of the op amp is positive and feedback current flows through diode 278 and resistor 276. If the input signal is positive compared to ground, the output of the op amp is negative which pulls the minus input of the op amp down through diode 274 until it is equal to the plus input. Thus, the amplifier has a gain of zero.

The signal output from the rectifier 194 is in the form of a pulsed DC voltage. This output signal is fed into a peak detector 196 having a certain time delay. The peak detector 196 comprises a resistor 288 which functions to convert the circuit to a constant current source. Because of the constant current output derived from the op amp 282, a linear charging curve across capacitor 292 is obtained. The rate of charging is proportional to the amount of positive signals at the input to the peak detector 196. Capacitor 292 is continually being discharged through resistor 290. In addition, the peak detector circuit 196 functions as an integrator and a time delay circuit which aids in preventing the circuit from reacting to the short lived arcing spikes created when a switch is thrown or an appliance is plugged in. The constant current amplifier is constructed around a single op amp 282 using resistors 284, 280, 288 and diode 286.

The arcing detected by both the line and load circuitry is categorized into three types:

high, low and very low arcing. In the presence of high arcing, the output of the peak detector 196 will comprise a substantial amount of pulses. The pulses charge capacitor 292 rapidly causing the voltage across it to reach the zener voltage of transistor 291 relatively quickly. The output of the transistor 291 labeled LINE_OUT forms the input to the arc detection circuit described in more detail hereinbelow.

When the arcing detected is low, the peak detector 196 generates pulses that are more dispersed. This causes the voltage across capacitor 292 to rise more slowly, thus delaying the breakover of transistor 291.

When the arcing detected is very low, the discharge rate of the capacitor 292 via resistor 290 is greater than or equal to the charging rate of the capacitor. Thus, the voltage across the capacitor 292 never reaches a sufficiently high level to cause breakover of the transistor 291.

Figure 11:
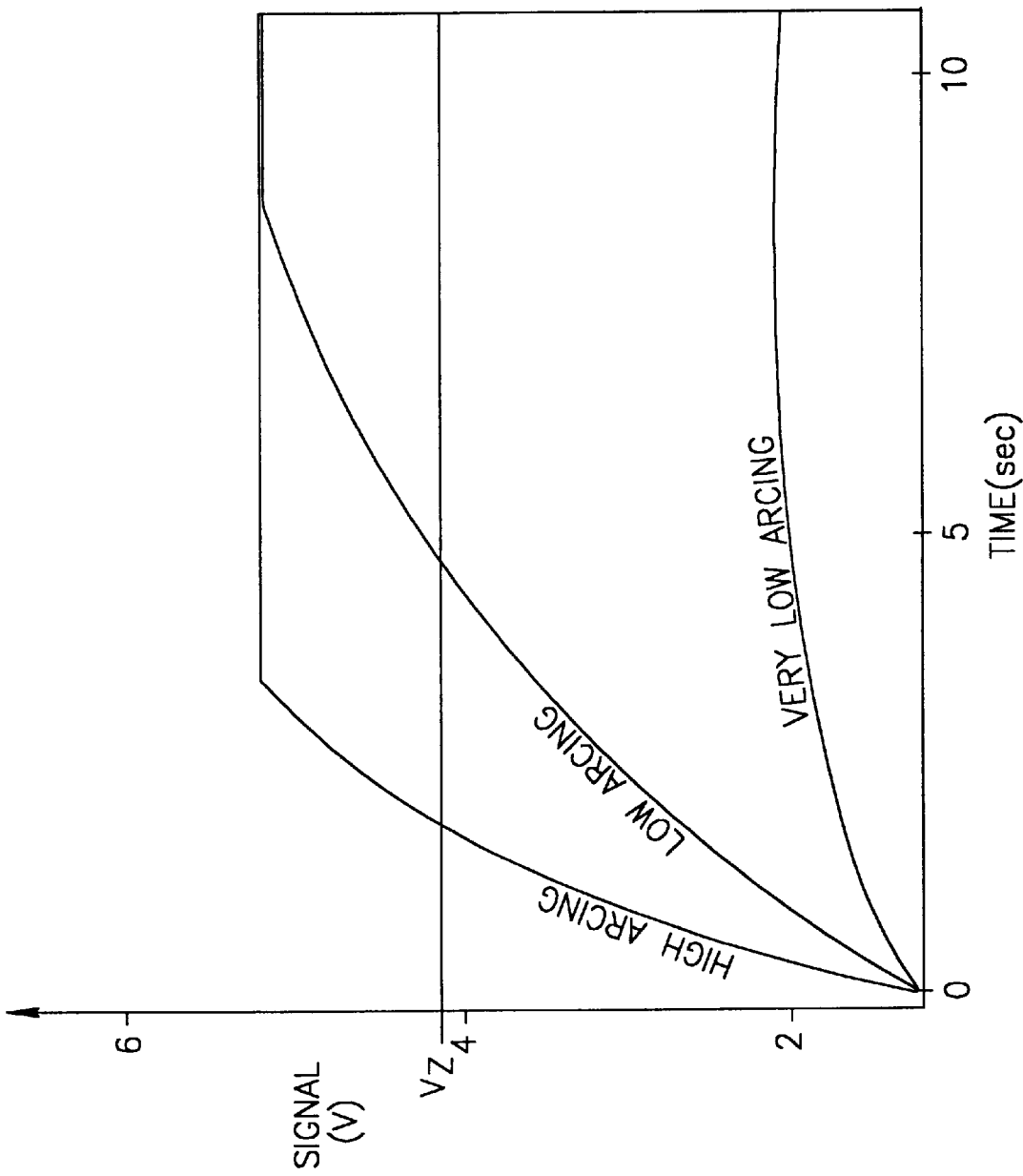
FIG. 11 is a graph illustrating the output of the rectifier stage portion of the load circuitry as a function of time for various levels of arcing.

A graph illustrating the output of the rectifier stage portion of the line and the load circuitry as a function of time for various levels of arcing is shown in FIG. 11. The relationship between high, low and very low arcing is shown relative to the zener voltage $V_Z$ of transistor 291.

The output voltage of integrator circuit 196 designated LOAD_AGC is also fed back to the AGC amplifier in the load circuitry. In similar fashion, the output LINE_AGC of the integrator circuit in the load circuitry 200 (FIG. 9) is fed back into the AGC amplifier 190 in the line circuitry 188. As described previously, the crossing of the feedback signals between the line and load circuits enhances the difference in the signals generated in each circuit which helps achieve better segregation between line and load signals.

Figure 9:
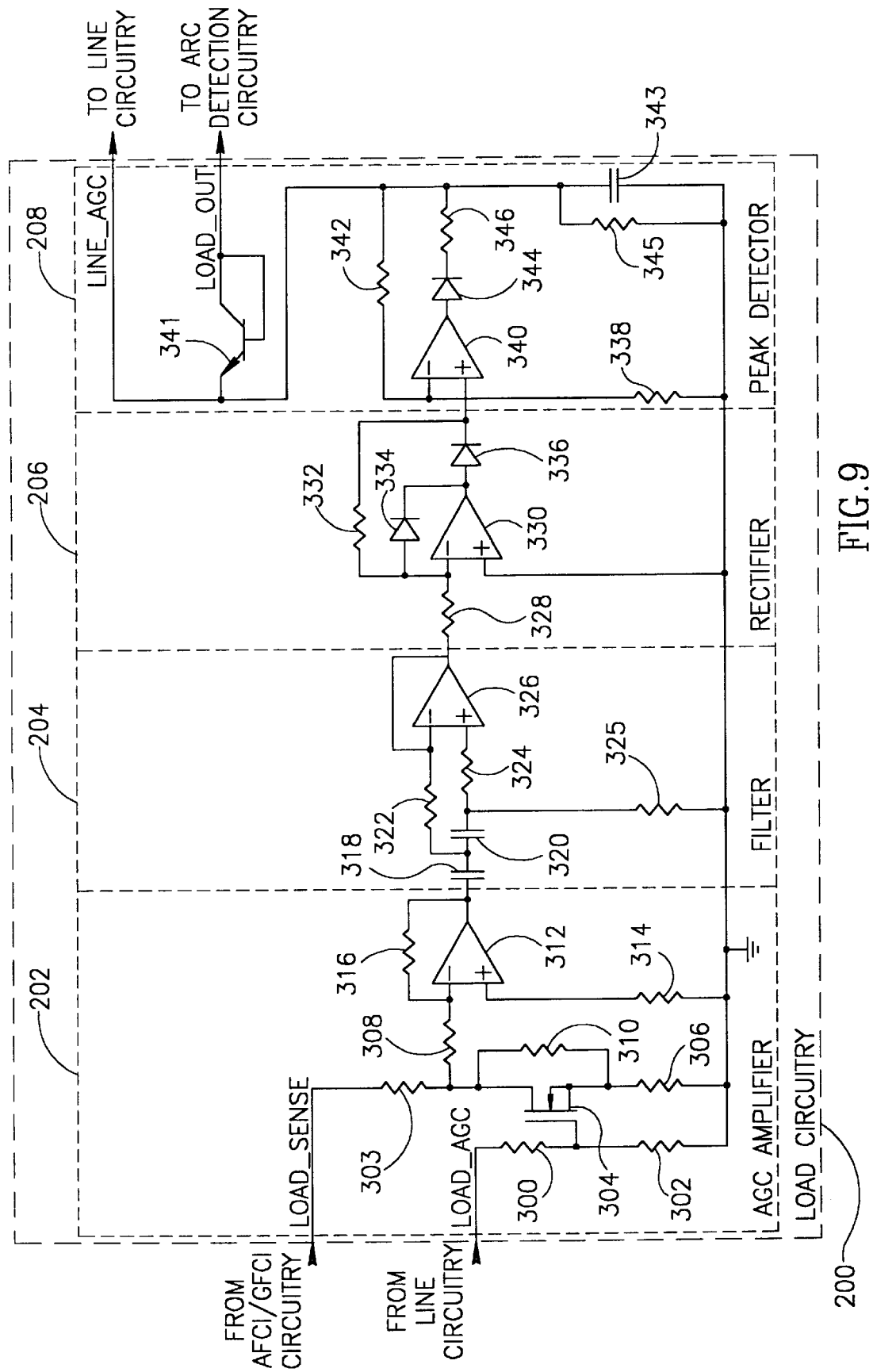
FIG. 9 is a schematic diagram illustrating the load circuitry in further detail.
Figure 10:
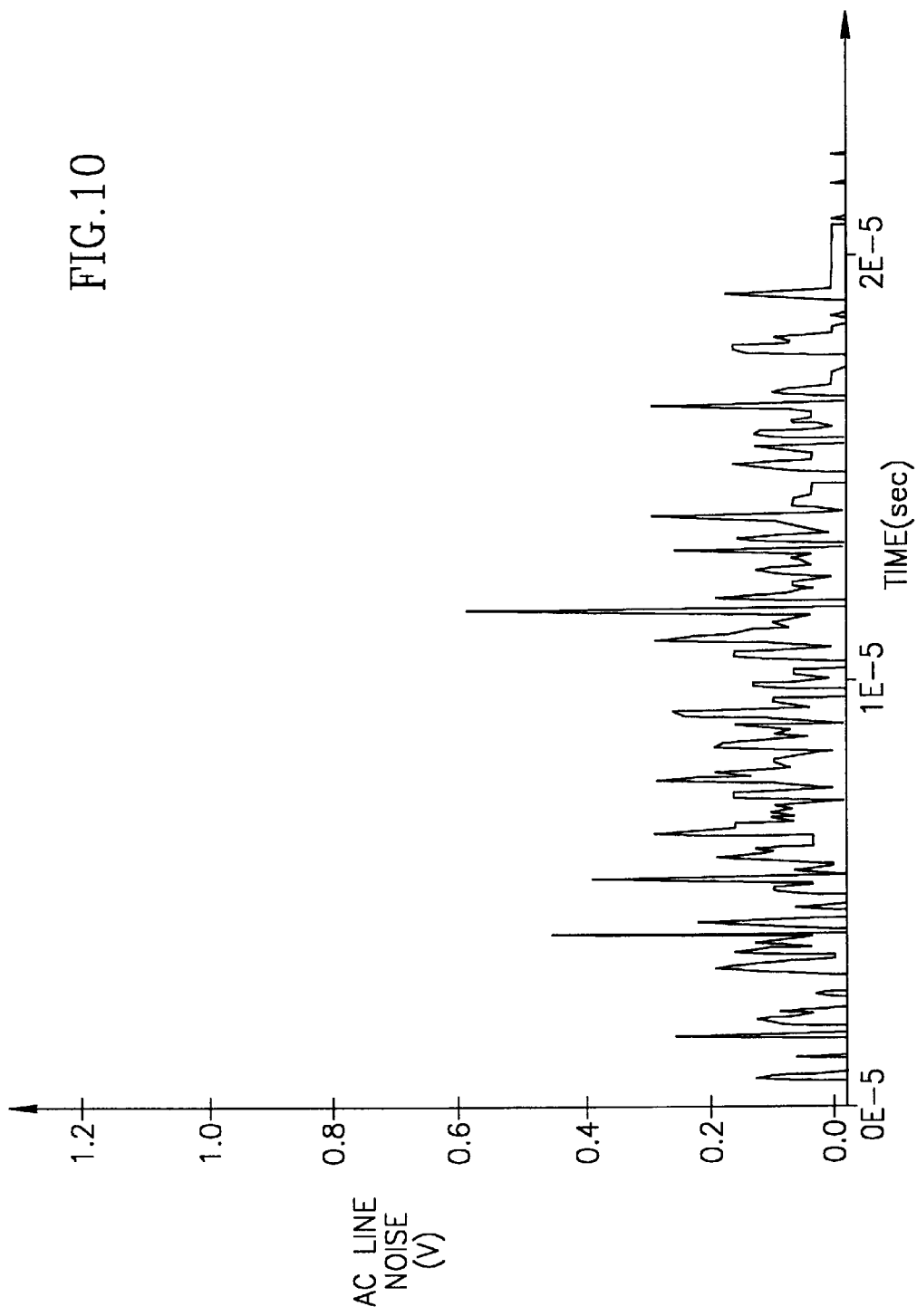
FIG. 10 is a graph illustrating an example of the noise present on the AC line.

A schematic diagram illustrating the load circuitry portion of the present invention in more detail is shown in FIG. 9. In the load processing path, the LOAD_SENSE signal. which is a signal having an amplitude exceeding 0.6 V peak to peak, is fed into an AGC amplifier 202. The AGC amplifier comprises a resistor divider 303, 310, 306 which determines the maximum dynamic range of the amplifier. Feedback control is provided through FET transistor 304, which acts as a variable resistance in parallel with resistor 310. An additional resistor divider network 300, 302 provides a voltage level for the gate of FET 304. A unique aspect of this circuit is that the feedback signal input to FET 304 in the load circuit is proportional to the signal level developed on the line side, since the feedback signal LOAD_AGC is input to the top of the resistor divider 300, 302.

The AGC amplifier stage 202 comprises an op amp circuit 312 having a fixed gain provided by precision resistors 308, 316. The plus input of the op amp 312 is tied to ground potential by resistor 314. The minus input to the amplifier 312 is connected to the junction of resistor 303 and the feedback controlled FET 304 via resistor 308. If resistors 303, 310, 306 are all equal then with no feedback, FET 304 is open circuit and 67% of the LOAD_SENSE signal enters the AGC amplifier. With full feedback, the FET transistor 304 is saturated and only 50% of the LOAD_SENSE signal enters the amplifier. Thus, by altering the values of resistors 303, 310, 306 and resistors 300, 302, the weight and responsiveness of the feedback can be varied.

The output of the AGC amplifier is input to a frequency selective network 204. To aid in illustrating the principle of operation of the present invention, the filter shown in FIG. 9 is a well known $2^{nd}$ order Butterworth high pass active filter. In practice, however, this filter can be constructed using a 4 to 8 pole network in order to obtain sharp cut off response at frequencies below 500 KHz. The gain of the filter is set at unity to permit maximum utilization of the high frequency characteristics of the op amp. Alternatively, an LC filter can be used where space is not a critical factor.

The high pass filter 204 is constructed around a single op amp circuit 326. Capacitors 318, 320 and resistors 322, 324, 325 perform the high pass filtering function. Utilizing these capacitors and resistors in conjunction with an op amp 326 provides a much steeper roll off in frequency gain below 500 KHz than would be achieved with passive components alone. The internal characteristics of the op amp itself provide the upper limit to the high frequencies passed by the filter. The characteristics of the filter in the line and the load circuits are preferably closely matched.

The output of the filter circuit 204 is input to rectifier circuit 206. The rectifier 206 is able to perform rectification at input voltages in the millivolt range and is constructed around a single op amp 330. The plus input of the op amp 330 is tied to ground. The circuit provides a variable level of gain, depending on whether the input signal is positive or negative. For positive input signals the gain is zero. For negative signals the gain is determined by the ratio of resistors 332 to 328. If the signal input to the minus input is negative relative to ground, the output of the op amp is positive and feedback current flows through diode 336 and resistor 332. If the input signal is positive compared to ground, the output of the op amp is negative which pulls the minus input of the op amp down through diode 334 until it is equal to the plus input. Thus, the amplifier has a gain of zero.

The signal output from the rectifier 206 is in the form of a pulsed DC voltage. This output signal is fed into a peak detector 208 having a certain time delay. The peak detector 208 comprises a resistor 346 which functions to convert the circuit to a constant current source. Because of the constant current output derived from the op amp 340, a linear charging curve across capacitor 343 is obtained. The rate of charging is proportional to the amount of positive signals at the input to the peak detector 208. Capacitor 343 is continually being discharged through resistor 345. In addition, the peak detector circuit 208 functions as an integrator and a time delay circuit. This aids in preventing the circuit from reacting to the short lived arcing spikes created when a switch is thrown or an appliance is plugged in. The constant current amplifier is constructed around a single op amp 340 using resistors 342, 338, 346 and diode 344.

In the presence of high arcing, the output of the peak detector 208 will comprise a substantial amount of pulses. The pulses charge capacitor 343 rapidly causing the voltage across it to reach the zener voltage of transistor 341 relatively quickly. The output of the transistor 341 labeled LOAD_OUT forms the input to the arc detection circuit described in more detail hereinbelow.

When the arcing detected is low, the peak detector 208 generates pulses that are more dispersed. This causes the voltage across capacitor 343 to rise more slowly, thus delaying the breakover of transistor 341.

When the arcing detected is very low, the discharge rate of the capacitor 343 via resistor 345 is greater than or equal to the charging rate of the capacitor. Thus, the voltage across the capacitor 343 never reaches a sufficiently high level to cause breakover of the transistor 345.

The peak detector 208 outputs a feedback voltage LINE_AGC which is fed back to the AGC amplifier in the load circuitry. As described previously, the crossing of the feedback signals between the line and load circuits enhances the difference in the signals generated in each circuit which helps achieve better segregation between line and load signals.

Figure 12:
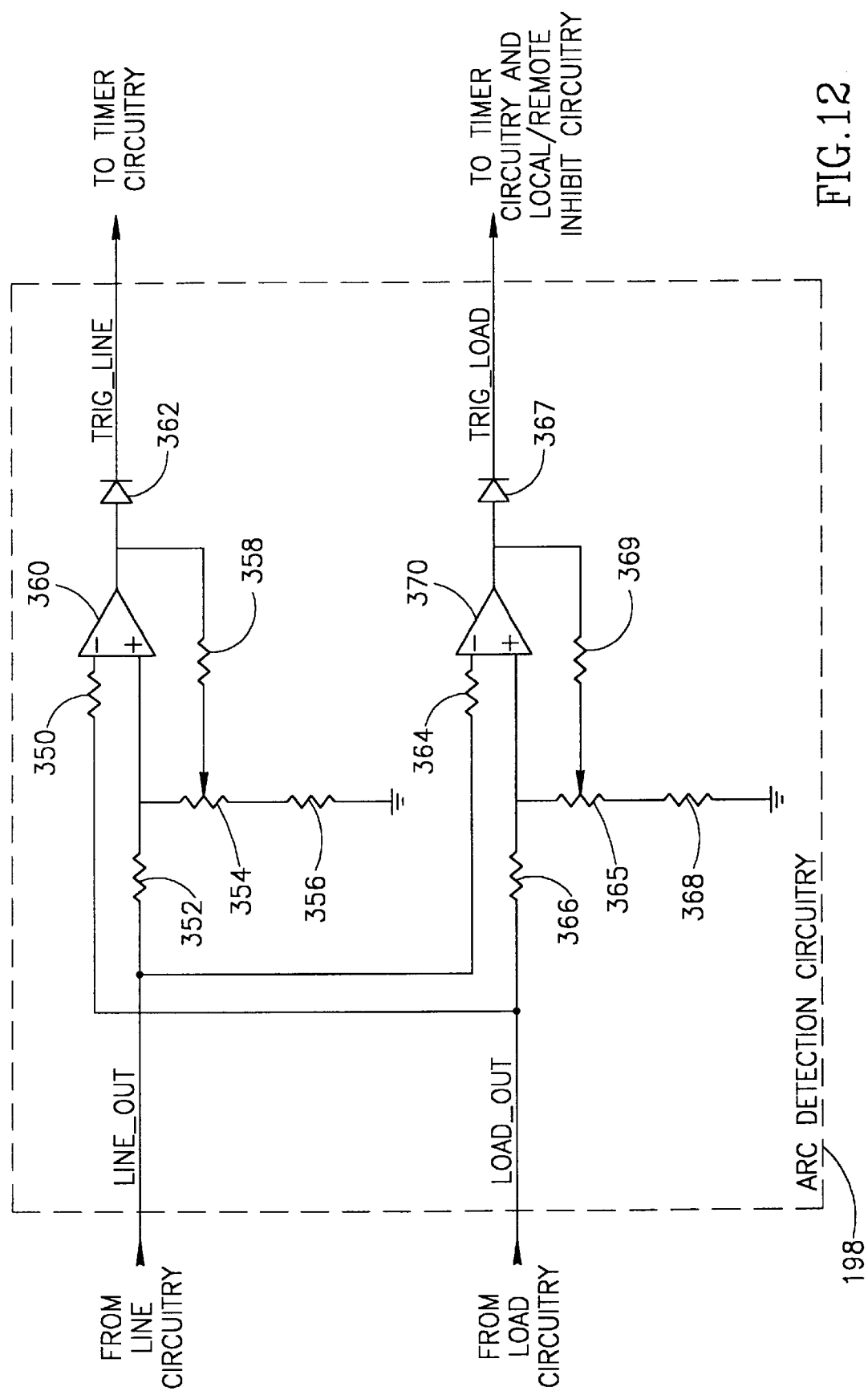
FIG. 12 is a schematic diagram illustrating the arc detection portion of the present invneiton in more detail.

The arc detection circuitry portion of the present invention will now be described in more detail. A schematic diagram illustrating the arc detection portion of the present invention in more detail is shown in FIG. 12. Once the output signals LINE_OUT, LOAD_OUT from the line and load circuits, respectively, exceed their relative zener diode breakdown voltages, they are fed simultaneously into comparators 360, 370. The two comparator circuits are similar in construction. Resistors 350, 352 provide input resistance to comparator 360. Resistor 358 provides feedback and resistors 354, 356 provide adjustable hysteresis for comparator 360. The output of comparator 360 is rectified by diode 362 forming the output signal TRIG_LINE which is input to the timer circuitry, described in more detail below.

Similar to the circuit comprising comparator 360, resistors 364, 366 provide input resistance to comparator 370. Resistor 369 provides feedback and resistors 365, 368 provide adjustable hysteresis for comparator 370. The output of comparator 370 is rectified by diode 367 forming the output signal TRIG_LOAD, which is input to the timer circuitry and the local/remote inhibit circuitry.

Note that both LINE_OUT and LOAD_OUT signals are input to both comparators 360, 370. The LINE_OUT signal is input to the plus input of comparator 360 and the minus input of comparator 370. The LOAD_OUT signal is input to the plus input of comparator 370 and the minus input of comparator 360.

If the LINE_OUT signal from the line circuit is higher than the LOAD_OUT signal from the load circuit, then the output of comparator 360 goes high. This assumes that the LINE_OUT signal is greater than the breakover voltage of transistor 291 (FIG. 8). If the LOAD_OUT signal is higher than the LINE_OUT signal, the output of comparator 370 is high. This assumes that the LOAD_OUT signal is greater than the breakover voltage of transistor 341 (FIG. 9). Note that the comparators are prebiased (not shown) ensuring that the outputs of the comparators are low at all other times. In addition, it is noted that comparator 360 functions to trigger an audible or visual warning device while comparator 370 functions to trigger the SCR and disconnect power from the AC line.

A problem associated with prior art AFCIs is that they annoyingly trip when equipment or appliances that produce heavy arc like signals, e.g., arc welders, are used. The present invention comprises timer circuitry 186 (FIG. 6) which functions to temporarily disable the detection of arc faults for a period of time such as minutes or even hours. The detection of any arcing during the time that the detector output is disabled, causes the period of disablement to extend by a time equal to the total time that arcing is detected. Thus, if arc detection is disabled for one hour and 10 minutes, and arcing is detected during that time, the detector becomes enabled one hour and 10 minutes later. In this manner, arc detection can be disabled for longer periods of time thus permitting the user uninterrupted use of the equipment or appliance.

Figure 13:
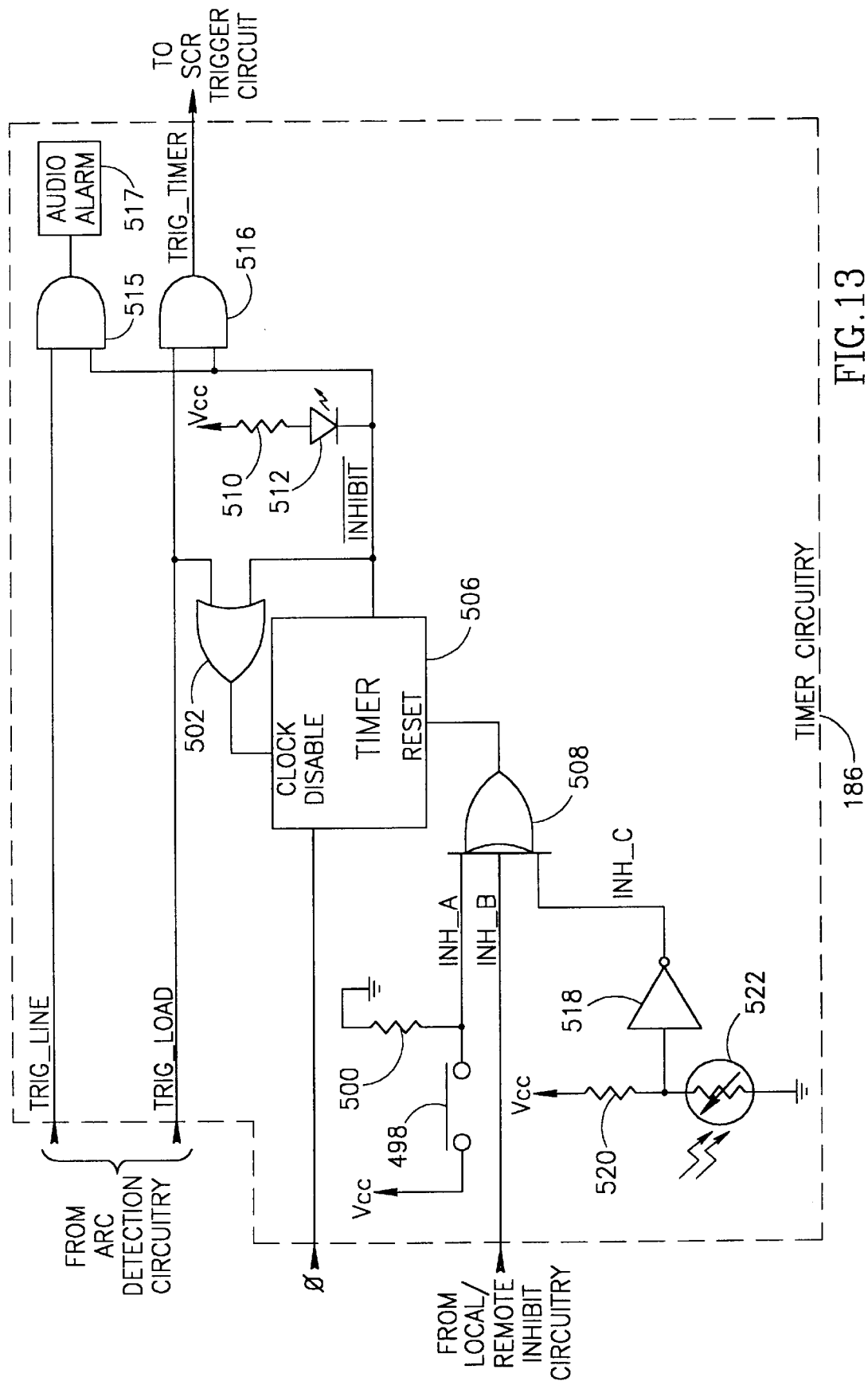
FIG. 13 is a schematic diagram illustrating the timer circuitry portion of the arc fault detection device of the present invention in more detail.

A schematic diagram illustrating the timer circuitry portion of the arc fault detection device of the present invention in more detail is shown in FIG. 13. The function of the timer circuitry 186 is to generate an active low $\overline{\text{INHIBIT}}$ signal that is gated with the TRIG_LOAD and the TRIG_LINE signals output by the arc detection circuitry. The $\overline{\text{INHIBIT}}$ signal is generated by a timer 506 and is normally high. The $\overline{\text{INHIBIT}}$ signal is gated with the TRIG_LOAD signal via AND gate 516 to generate the TRIG_TIMER signal. The TRIG_TIMER signal is then input to the SCR trigger circuit 236 (FIG. 7). Since the output of the timer is normally high, the TRIG_LOAD signal is normally enabled so that the relay can trip. The application of an active high pulse to the RESET input of the timer starts the timer running. When a pulse is applied the reset input, the $\overline{\text{INHIBIT}}$ signal is pulled low until the timer count reaches a specified number of clock cycles. During the time that the $\overline{\text{INHIBIT}}$ signal is low, the TRIG_TIMER signal is disabled. After the disablement of the timer ends, the $\overline{\text{INHIBIT}}$ signal returns to its active high state. The $\overline{\text{INHIBIT}}$ signal is gated with the TRIG_LINE signal via AND gate 515 to generate an audible or visual alarm 517. The 50 or 60 Hz phase conductor of the AC line serves as the clock source for the timer 506. The timer comprises zero detecting means, well known in the art, for detecting the zero crossings of the AC wave which forms the timer input clock signal. Within the timer, the 50 or 60 Hz high voltage sine wave is converted to a low voltage square wave of the same frequency. The timer also comprises counting means, such as a plurality of Johnson counters. The internally generated square wave is used as the clock input for the counters. By suitable selection of the counter means, any time period can be arbitrarily generated by the timer. For example, with 60 Hz AC power and a divide by 216,000 counter, the timer output returns to a high state one hour after being reset.

A gate (not shown) separates the clock generator from the counters within the timer. This gate is controlled by an input labeled CLOCK DISABLE, which is internally latched. When the CLOCK DISABLE input is high, the clock is prevented from driving the counters. Thus, the timer is "paused" until the CLOCK DISABLE input is removed. When the CLOCK DISABLE input is returned to active low the timer resumes counting from the point at which it paused.

The timer also comprises a RESET input. An active high pulse on the RESET input forces the output of the timer, i.e., the $\overline{\text{INHIBIT}}$ signal, low and sets all the counter registers to zero. The timer is preferably of the resetable type, i.e., it can be made to start counting from zero at any time, even during counting. A continuous active high on the RESET input will keep the counter at zero and therefore keep the $\overline{\text{INHIBIT}}$ signal permanently low.

When the $\overline{\text{INHIBIT}}$ signal is high, the CLOCK DISABLE input of the timer is pulled high via the output of OR gate 502. This prevents the timer from counting further and latches the timer in a high output state.

As described previously, the detection of an arc fault will extend the period of disablement. Assuming the $\overline{\text{INHIBIT}}$ signal is low, i.e., the timer is counting, a high TRIG_LOAD signal will produce a high at the CLOCK DISABLE input of the timer through the OR gate 502. Thus, the timer pauses for the period of time that the TRIG_LOAD signal is high. This means that the re-enabling of the TRIG_TIMER signal is delayed by the amount of time that the TRIG_LOAD signal is high. If the timer is not counting, i.e., the $\overline{\text{INHIBIT}}$ signal is high, then the TRIG_LOAD signal has no effect on the timer.

This method of delaying the timer is used to ensure that the TRIG_TIMER signal will always be re-enabled, even if arcing starts while the timer is counting. Even if arcing is intermittent and starts while the timer is counting, the counter will still be incremented during the gaps between arcing, and arc detection will be enabled at some time after arcing began. Thus, the timer circuit significantly reduces tripping due to the normal arcing generated by equipment and appliances, while ensuring that the GFCI/AFCI will eventually trip in the presence of arcs.

While the timer is counting, the $\overline{\text{INHIBIT}}$ signal is low, thus disabling the TRIG_TIMER signal and the audible/visual alarm 517. A light emitting diode (LED) 512 is connected to the output of the timer 506. The LED is also connected to the power supply $V_{CC}$ via a current limiting resistor 510. When the $\overline{\text{INHIBIT}}$ signal is low, the LED is lit indicating that arc detection has been temporarily disabled. When the $\overline{\text{INHIBIT}}$ signal is high the LED is extinguished indicating that arc detection is enabled.

Three signals combine to form the RESET signal: INH_A, INH_B and INH_C. These three signals are gated together through OR gate 508 to generate the RESET signal input to the RESET input of timer 506. Thus, INH_A, INH_B or INH_C going high will reset the timer. The three signals input to the OR gate 508 will now be described in more detail.

The timer can be reset by a user by pressing momentary push button switch 498. The INH_A signal, which is normally pulled low through resistor 500 tied to ground, is momentarily pulled active high. One alternative is to gang the switch 498 to the switch mechanism that provides the test pulse for the GFCI circuit. Arc detection is then disabled for a predetermined time period when the GFCI is tested. In other words, testing the GFCI before an appliance like a vacuum cleaner is used in the house will ensure that the device will not trip when the vacuum is used. Arc detection is automatically enabled a timer period after use of the arc generating appliance is disconnected.

As described previously, the output of the timer is normally high, allowing arc detection. One alternative is for the $\overline{\text{INHIBIT}}$ signal to go high immediately upon the power first being applied to the AFCI device. An alternative is for the timer to be reset upon power being applied. A third and preferred alternative is for the $\overline{\text{INHIBIT}}$ signal to be pulled low for a few AC cycles, e.g., 1 second, and then permitted to go active high. It produces greater noise immunity, as the transients associated with the power being applied will be ignored by the AFCI circuitry. Moreover, the AFCI is not inhibited for a long period of time unnecessarily.

In situations where arc generating machinery is used throughout the day, such as in a factory with arc welding machinery, the detection of arc faults is only practical at night. Thus, the AFCI should be disabled during the day and enabled at night. A photoelectric cadmium selenide or cadmium sulfide photocell 522 is provided to inhibit arc faults from tripping the device. The photocell 522 is connected to $V_{CC}$ via resistor 520. During daylight hours, the resistance of the photocell drops to a very low value, creating a low at the input to inverter 518. The output of the inverter INH_C goes high causing the RESET input of the timer to go high. This disables the TRIG_LOAD signal from tripping the device. Conversely, at night or in the absence of light, the resistance of the photocell 522 rises to a high value causing the input to the inverter 518 to go high. The inverter output goes low, removing the INH_C signal, enabling the timer and permitting the arc detector to trip. Note that in the absence of light, the resistance of a cadmium selenide photocell may rise to 100 MΩ or more.

Figure 14:
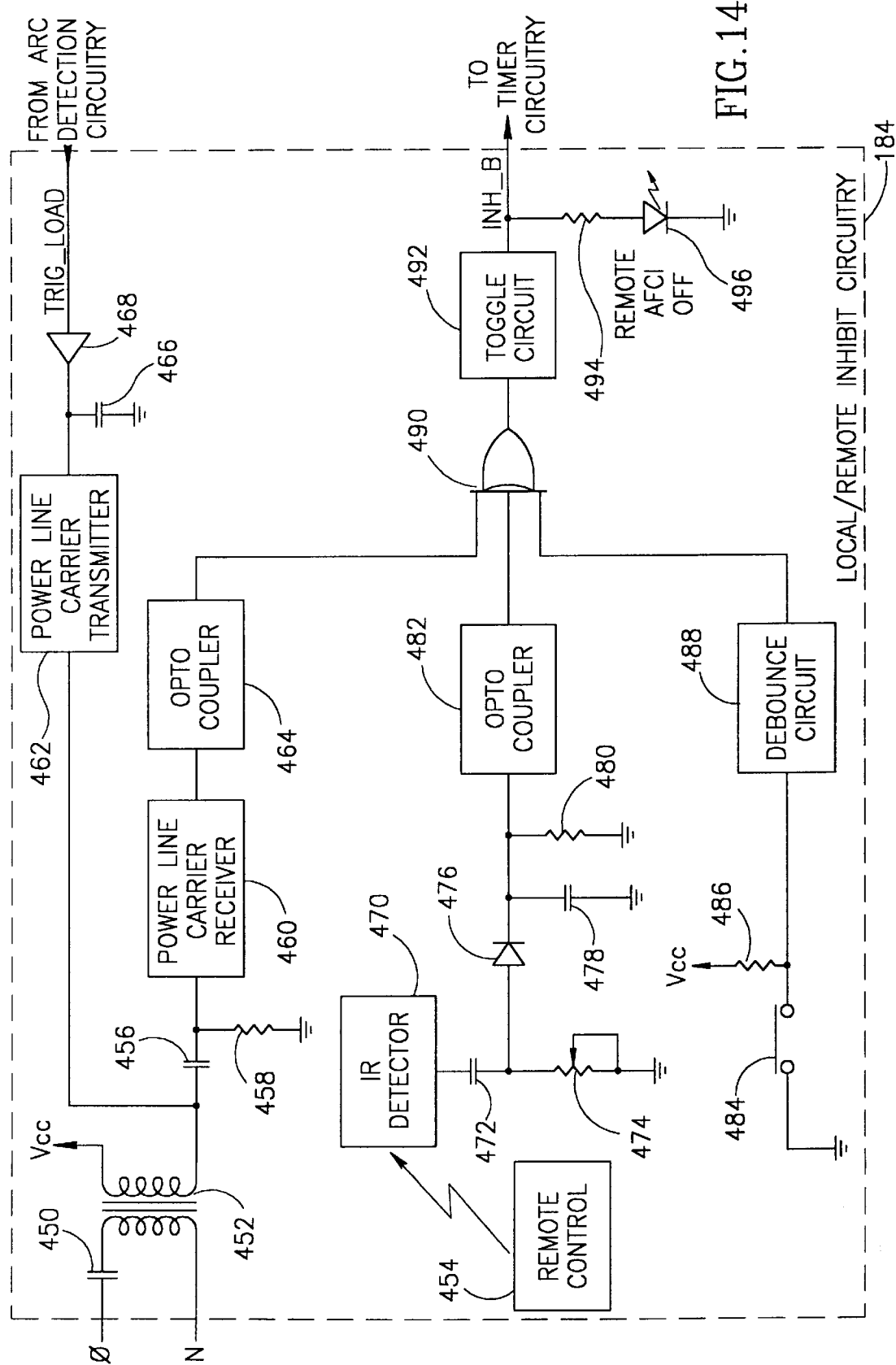
FIG. 14 is a schematic diagram illustrating the local/remote inhibit circuitry portion of the arc fault detection device of the present invention in more detail.

A third source, INH_B, for the RESET input is also input to the OR gate 508. This INH_B signal is generated by the local/remote inhibit circuitry which will now be described in more detail. A schematic diagram illustrating the local/remote inhibit circuitry portion of the arc fault detection device of the present invention in more detail is shown in FIG. 14. The local/remote inhibit circuitry 184 comprises circuitry that also inhibits the TRIG_LOAD signal from tripping the device. The local/remote inhibit circuitry 184 can be constructed as an integral part of the AFCI/GFCI device or it can be constructed in its own external housing and connected to the main embodiment by a plurality of wires. The local/remote inhibit circuitry functions to turn the device on and off via momentary push button, turn the AFCI on and off via an infrared receiver, turn the AFCI on and off via a signal from any suitable communication means and send a signal via any suitable communication means, indicating the occurrence of an arc fault, to a remotely located receiver.

Infrared (IR) reception is achieved through IR detector 470 which may comprise an infrared diode which functions to pickup the pulsing signal from an IR transmitter 454. The transmitter may comprises a fixed transmitter or, in the alternative, any TV or stereo remote control that emits IR pulses modulated by a frequency in the range of 30 to 45 KHz. A receiving diode in the IR detector 470 changes its impedance upon reception of IR pulsing energy. The capacitor 472 passes these pulses through to resistor 474 while blocking DC. This limits the sensitivity of the device to any constant or slowly changing light level, e.g., daylight. The pulsating DC across pot 474 charges the capacitor 478 through diode 476. The resulting DC level is input to an opto coupler 482. Current flowing to the input of the opto coupler causes its output to go high. The output of the opto coupler is input to an OR gate 490. A high output of the opto coupler causes the output of the OR gate to go high. The output of the OR gate 490 is input to a toggle circuit 492. The toggle circuit 492 operates in one of two alternative, user selected modes. In the first mode, the toggle circuit 492 functions to flip its output from low to high or high to low upon each low to high transition of its input. In the second mode, the toggle circuit 492 functions to produce an active high pulse upon each low to high transition of its input.

The output of the toggle circuit 492 forms the INH_B signal, which is input to the OR gate 508 (FIG. 13). In the first toggle switch mode, the INH_B signal is held high until another input to the toggle circuit occurs. The arc detector is disabled until the local/remote inhibit circuitry releases the INH_B signal. In the second toggle switch mode, the INH_B pulse resets the timer but the AFCI is enabled automatically after the predetermined time period.

The status of the output of the local/remote inhibit circuit output is indicated via LED 496, which is connected to INH_B via resistor 494. In the first toggle switch mode, the lighted LED indicates that the AFCI is being disabled via remote means. In the second toggle switch mode, a flash of the LED 496 indicates that a reset pulse has been sent to the timer 506 (FIG. 13).

In addition, the circuitry 184 also comprises circuitry to enable a user to reset the timer or permanently disable the AFCI/GFCI device from a remote location. One end of momentary push button switch 484 is connected to ground and the other end is connected to a debounce circuit 488. The input to the debounce circuit 488 is help high by resistor 486 tied to $V_{CC}$. The output of the debounce circuit is input to OR gate 490. The debounce circuit functions to output a low while the switch 484 is open. When the switch is closed, the output of the debounce circuit 488 goes high causing the output of the OR gate 490 to go high, toggling the IN_B signal.

The local/remote inhibit circuitry 184 also comprises the capability to receive an on/off command via suitable communication means. For example, such communication means may comprise any power line carrier, RF, twisted pair or IR communication technology. An example of power line carrier communications include Lon Works and CEBus communications systems. By way of example only, the present invention comprises a power line carrier receiver 460, such as the CCS receiver manufactured by Leviton Manufacturing, little Neck, N.Y., functions to receive a signal transmitted over the power line, decode and interpret the received command and output a signal to the opto coupler 464. The CCS power line carrier signal is modulated by a carrier of 121 KHz. This signal is extracted from the AC line through capacitor 450 and coupling transformer 452. The capacitor 456 and resistor 458 function to high pass filter the input to the receiver 460. The output of the opto coupler 464 is input to the OR gate 490. Thus, a high output of the opto coupler 464 causes the INH_B output of the toggle circuit 492 to change states.

In addition, the present invention comprises communication means, e.g., power line carrier transmitter 462, to transmit arc fault information, e.g., the disconnection of the source of electrical power from the load, to a remotely located receiver, pinpointing the location of the fault. Other means of communications may be substituted for power line carrier without departing from the scope of the invention. A dedicated indicator panel can be connected to the remote receiver where arc fault information is monitored by building personnel. This feature is desirable in industrial or commercial facilities, such as schools, supermarkets, etc. where the electrical system is centrally supervised.

The TRIG_LOAD signal from the arc detection circuitry is input to buffer 468 whose output is smoothed via capacitor 466. The output of the buffer 468 is input to the transmitter 462 which functions to generate an Output signal based on the state of TRIG_LOAD. Though arcing may cease or be intermittent, the capacitor 466 maintains sufficient charge to keep the transmitter 462 activated long enough to transmit the required information through the AC line. The transmitter 462 comprises power transistor means to transfer the output of the transmitter onto the AC line via the line side phase and neutral terminals. Note that both the phase and neutral line connections and the indicator panel are located upstream of the AFCI/GFCI so that they are not disconnected in the event the device trips.

In addition, it is noted that even if the timer has been triggered, temporarily inhibiting the TRIG_LOAD signal, the occurrence of an arc fault is nevertheless transmitted to the remote indicator via the transmitter 462. It is desirable to have an indication of an arc fault even if it is generated from equipment or appliances. Alternatively, the TRIG_TIMER signal can be input to the transmitter 462 thus preventing notification of arc faults while the $\overline{\text{INHIBIT}}$ signal is low.

As discussed previously, the arc detector of the present invention can be used a stand alone arc fault detector or combined with other types of circuit interrupting devices in addition to a GFCI. When used as a stand alone device, the AFCI/GFCI circuit of FIG. 7 is modified to include only arc fault related circuitry. In particular, the two GFCI related transformers 233, 234 and their related circuitry including the LM1851 IC 225 would be removed. The SCR trigger circuit 236 would need only two inputs, i.e., TRIG_ARC and TRIG_TIMER. The remainder of the circuit would remain, i.e., MOV, diode bride, coil, power supply, relay switches, etc.

While the invention has been described with respect to a limited number of embodiments, it will be appreciated that many variations, modifications and other applications of the invention may be made.

We claim:

1. An arc fault circuit interrupter (AFCI) device electrically connected to an electrical wiring system between a source of electrical power including line side phase and neutral conductors and a load including phase and neutral conductors, said device comprising:
    first arc fault circuit means for detecting arc faults occurring on said line side of said electrical wiring system and outputting an arc fault indicative signal of a line side arc fault;
    second arc fault circuit means for detecting arc faults occurring on said load side of said electrical wiring system and outputting an arc fault indicative signal of a load side arc fault;
    means responsive to said arc fault indicative signals for distinguishing between arc faults occurring on said line side and said load side of said device, and for generating an arc fault trigger signal in response to the detection of an arc fault at least for arc faults occurring on said load side;
    trigger means for generating a switching signal upon receipt of said arc fault trigger signal; and
    switching means electrically connected in series between said line side phase and neutral conductors and said load side phase and neutral conductors, said switching means for disconnecting said source of electrical power to said load side phase and neutral conductors in response to said switching signal.

2. The device according to claim 1, further comprising means for interrupting the flow of current to a load electrically connected to said device in response to the detection of a fault other than an arc fault.

3. The device according to claim 2, wherein said interrupting means comprises ground fault circuit interrupter (GFCI) means for detecting the occurrence of a ground fault between said phase conductor and ground or between said neutral conductor and ground, said ground fault circuit means being operative to generate a ground fault trigger signal in response to the detection of said ground fault.

4. The device according to claim 1, wherein said first arc fault circuit means comprises line pickup means located on said line side of said device for detecting arcing occurring on said electrical wiring system.

5. The device according to claim 4, wherein said line pickup means comprises a toroidal ferrite transformer.

6. The device according to claim 4, wherein said line pickup means comprises a resonance damping network for enhancing broadband frequency pickup.

7. The device according to claim 4, wherein said line pickup means comprises capacitive coupling means for coupling said line side of said device to said electrical wiring system.

8. The device according to claim 1, wherein said second arc fault means comprises load pickup means located on said load side of said device for detecting arcing occurring on said electrical wiring system.

9. The device according to claim 8, wherein said load pickup means comprises a toroidal ferrite transformer.

10. The device according to claim 8, wherein said load pickup means comprises a resonance damping network for enhancing broadband frequency pickup.

11. The device according to claim 8, wherein said load pickup means comprises capacitive coupling means for coupling said load side of said device to said electrical wiring system.

12. The device according to claim 1, wherein said first arc fault means comprises line side impedance means for enhancing the high frequency line impedance on said line side of said device.

13. The device according to claim 12, wherein said line side impedance means comprises a ferrite bead.

14. The device according to claim 1, wherein said second arc fault means comprises load side impedance means for enhancing the high frequency line impedance on said load side of said device.

15. The device according to claim 14, wherein said load side impedance means comprises a ferrite bead.

16. The device according to claim 1, wherein said first arc fault circuit means comprises a line side transformer through which either said line side phase or neutral conductor passes through, said transformer being operative to generate a current proportional to the current flowing through said line side phase or neutral conductor.

17. The device according to claim 1, wherein said second arc fault circuit means comprises a load side transformer through which either said load side phase or neutral conductor passes through, said transformer being operative to generate a current proportional to the current flowing through said load side phase or neutral conductor.

18. The device according to claim 1 further comprising means for partially disabling arc detection for a finite period of time, the disabling of arc detection providing a user with the ability use an electrical device exhibiting arcing.

19. The device according to claim 1 further comprising communication means for communicating the generation of said switching signal.

20. The device according to claim 1 further comprising means for receiving an external disable command and disabling arc detection in accordance therewith.

21. The device according to claim 1 further comprising means for a user to manually turn arc detection on and off.

22. The device according to claim 1 further comprising means for disabling arc detection during daylight hours and enabling arc detection during night hours.

23. The device according to claim 1 further comprising means for disabling and enabling arc detection in accordance with signals received from a remote infrared (IR) transmitter.

24. An arc fault detecting circuit operatively coupled to a line side and a load side of at least one conductor of an electrical wiring system, comprising:
    line detection means for sensing high frequency signals on said line side of said at least one conductor;
    load detection means for sensing high frequency signals on said load side of said at least one conductor;
    line circuit means for generating a line output signal in accordance with the output of said line detection means;
    load circuit means for generating a load output signal in accordance with the output of said load detection means; and
    arc detect means for generating said arc fault trigger signal when said load output signal is greater than said line output signal.

25. The device according to claim 24, further comprising audible alarm means for sounding an audible alarm when said line output signal is greater than said load output signal.

26. An arc fault circuit interrupter (AFCI) device electrically connected to an electrical wiring system between a source of electrical power including line side phase and neutral conductors and load including phase and neutral conductors, said device comprising:

arc fault circuit means for detecting arc faults occurring on said electrical wiring system, said arc fault circuit means for distinguishing between arc faults occurring on said line side and said load side of said device, said arc fault circuit means operative to generate an arc fault trigger signal in response to the detection of an arc fault;

trigger means for generating a switching signal upon receipt of said arc fault trigger signal;

switching means electrically connected in series between said line side phase and neutral conductors and said load side phase and neutral conductors, said switching means for disconnecting said source of electrical power to said load side phase and neutral conductors in response to said switching signal; and timer means for partially disabling arc detection for a finite period of time, the disabling of arc detection providing a user with the ability to use an electrical device exhibiting arcing, said timer means enabling arc detection after use of said electrical device has been discontinued.

27. An arc fault circuit interrupter (AFCI) device electrically connected to an electrical wiring system between a source of electrical power including line side phase and neutral conductors and load side including phase and neutral conductors, said device comprising:

line detection means for sensing high frequency signals on said electrical wiring system on the line side of said device;

load detection means for sensing high frequency signals on said electrical wiring system on the load side of said device;

line circuit means for generating a line output signal in accordance with the output of said line detection means, said line output signal being indicative of an arc fault on said line side on said electrical wiring system;

load circuit means for generating a load output signal in accordance with the output of said load detection means, said load output signal being indicative of an arc fault on said load side on said electrical wiring system;

arc detect means for generating an arc fault trigger signal upon the occurrence of a load side arc fault;

trigger means for generating a switching signal upon receipt of said arc fault trigger signal; and switching means electrically connected in series between said line side phase and neutral conductors and said load side phase and neutral conductors, said switching means for disconnecting said source of electrical power to said load side phase and neutral conductors in response to said switching signal.

28. The device according to claims 26 or 27, further comprising means for interrupting the flow of current to a load electrically connected to said device in response to detection of a fault other than an arc fault.

29. The device according to claim 28, wherein said interrupting means comprises ground fault circuit interrupter (GFCI) means for detecting the occurrence of a ground fault between said phase conductor and ground or between said neutral conductor and ground, said ground fault circuit means being operative to generate a ground fault trigger signal in response to the detection of said ground fault.

30. The device according to claim 27, wherein said arc detect means generates said arc fault trigger signal when said load output signal is greater than said line output signal.

31. The device according to claim 27, further comprising means for generating an alarm signal when said line output signal is greater than said load output signal.

32. The device according to claim 26 further comprising means for partially disabling arc detection for a finite period of time, the disabling of arc detection providing a user with the ability use an electrical device exhibiting arcing, said timer means enabling arc detection after use of said electrical device has been discontinued.

33. The device according to claims 26 or 27, further comprising communication means for communicating the generation of said switching signal.

34. The device according to claims 26 or 27, further comprising means for receiving an external disable command and disabling arc detection in accordance therewith.

35. The device according to claims 26 or 27, further comprising means for a user to manually turn arc detection on and off.

36. The device according to claims 26 or 27, further comprising means for disabling arc detection during daylight hours and enabling arc detection during night hours.

37. The device according to claims 26 or 27, further comprising means for disabling and enabling arc detection in accordance with signals received from a remote infrared (IR) transmitter.

38. The device according to claim 27 further comprising means for partially disabling arc detection for a finite period of time, the disabling of arc detection providing a user with the ability use an electrical device exhibiting arcing.

39. In an arc fault circuit interrupter (AFCI) device connected to an electrical wiring system via line side phase and neutral conductors and load side phase and neutral conductors, a method of detecting arc faults, comprising the steps of:

detecting high frequency signals on said line side of said device and processing said high frequency signals to generate a line output signal if said high frequency signals include an arc fault;

detecting high frequency signals on said load side of said device and processing said high frequency signals to generate a load output signal if said high frequency signals include an arc fault; and disconnecting said source of electrical power from at least one of said load side phase and neutral conductors when said load output signal exceeds said line output signal.

40. In an arc fault circuit interrupter (AFCI) device connected to an electrical wiring system via line side phase and neutral conductors and load side phase and neutral conductors, a method of detecting arc faults and ground faults, comprising the steps of:

detecting high frequency signals on said line side of said device and processing said high frequency signals to generate a line output signal if said high frequency signals include an arc fault;

detecting high frequency signals on said load side of said device and processing said high frequency signals to generate a load output signal if said high frequency signals include an arc fault;

detecting ground faults associated with said conductors, and generating a ground fault trigger signal in response to the detection of a ground fault;

disconnecting said source of electrical power from at least one of said load side phase and neutral conductors when said load output signal exceeds said line output signal or in response to said ground fault trigger signal.

41. The method according to claims 39 or 40, further comprising the step of partially disabling arc detection for a finite period of time, the disabling of arc detection providing a user with the ability use an electrical device exhibiting arcing, and enabling arc detection after use of said electrical device has been discontinued.

42. The method according to claims 39 or 40, further comprising the step of communicating the disconnection of said source of electrical power from said load.

43. The method according to claims 39 or 40, further comprising the step of receiving a disable command and disabling arc detection in accordance therewith.

44. The method according to claims 39 or 40, further comprising the step of providing the ability for a user to manually turn arc detection on and off.

45. The method according to claims 39 or 40, further comprising the step of disabling arc detection during daylight hours and enabling arc detection during night hours.

46. The method according to claims 39 or 40, further comprising the step of disabling and enabling arc detection in accordance with signals received from a remote infrared (IR) transmitter.

47. An arc fault circuit interrupter device for installation in electrical wiring systems having phase and neutral conductors, said device being capable of being electrically connected at a line side to a source of electrical power and at a load side to at least one load, said device comprising:

a first arc fault detector operatively associated with at least one of the line side phase and neutral conductors to detect arc faults occurring on the line side of the electrical wiring system and to output a first arc fault signal indicative of a line side arc fault;

a second arc fault detector operatively associated with at least one of the load side phase and neutral conductors to detect arc faults occurring on the load side of the device and to output a second arc fault signal indicative of a load side arc fault;

a signal processing circuit coupled to the outputs of the first and second arc fault detectors, the processing circuitry being responsive to at least one of said first and second arc fault signals to distinguish between arc faults occurring on the line side and the load side of the device, and to output an arc fault trigger signal at least when an arc fault occurs on said load side of the device;

a trigger circuit coupled to the output of the signal processing circuit, the trigger circuit being responsive to the arc fault trigger signal so as to output a switching signal upon receipt of said arc fault trigger signal; and a switch electrically connected in series between at least one of the line and load side phase conductors and the line and load side neutral conductors, and responsive to said switching signal from the trigger circuit, such that said switch interrupts power between the line side and load side of said device in response to said switching signal.

48. The device according to claim 47 further comprising a fault detector operatively associated with at least one of the line and phase conductors to detect faults other than arc faults and to output a trigger signal to said trigger circuit, such that upon detection of a fault other than an arc fault said trigger circuit causes said switch to interrupt power between the line and load side of the device.

49. The device according to claim 48, wherein said fault detector comprises a ground fault circuit interrupter that detects the occurrence of a ground fault.

50. The device according to claim 47, wherein said first arc fault detector comprises a line pickup associated with at least one of the line side phase and neutral conductors.

51. The device according to claim 50, wherein said line pickup comprises a toroidal ferrite transformer.

52. The device according to claim 50, wherein said line pickup comprises a resonance damping network.

53. The device according to claim 50, wherein said line pickup comprises a capacitive coupling network.

54. The device according to claim 47, wherein said second arc fault detector comprises load pickup associated with at least one of the load side phase and neutral conductors.

55. The device according to claim 54, wherein said load pickup comprises a toroidal ferrite transformer.

56. The device according to claim 54, wherein said load pickup comprises a resonance damping network.

57. The device according to claim 54, wherein said load pickup comprises a capacitive coupling network.

58. The device according to claim 47, wherein said first arc fault detector comprises a line side transformer through which at least one of said line side phase and neutral conductors pass through, said line side transformer being operative to generate a current proportional to the current flowing through said at one of said line side phase and neutral conductors.

59. The device according to claim 47, wherein said second arc fault detector means comprises a load side transformer through at least one of said line side phase and neutral conductors pass through, said load side transformer being operative to generate a current proportional to the current flowing through said at least one of said load side phase and neutral conductors.

60. An arc fault detecting circuit operatively coupled to a line side and a load side of at least one conductor of an electrical wiring system, comprising:

a line sensor operatively associated with the at least one conductor of the electrical wiring system at the line side, which senses high frequency signals on the at least one conductor at the line side and outputs a line arc fault sense signal;

a line output signal generator coupled to the output of said line sensor, and responsive to said line arc fault sense signal to generate a line output signal if said sensed high frequency signal includes an arc fault;

a load sensor operatively associated with the at least one conductor of the electrical wiring system at the load side, which senses high frequency signals on the at least one conductor at the load side and outputs a load arc fault sense signal;

a load output signal generator coupled to the output of said load sensor, and responsive to said load arc fault sense signal to generate a load output signal if said sensed high frequency signal includes an arc fault; and an arc detector coupled to said line and load output signal generators which generates said arc fault trigger signal when said load output signal is greater than said line output signal.

* * * * *